(12) United States Patent
Araki

(10) Patent No.: US 8,677,090 B2
(45) Date of Patent: Mar. 18, 2014

(54) FIRST STORAGE APPARATUS AND FIRST STORAGE APPARATUS CONTROL METHOD

(75) Inventor: Masanori Araki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 270 days.

(21) Appl. No.: 13/202,564

(22) PCT Filed: Jul. 20, 2011

(86) PCT No.: PCT/JP2011/004105
§ 371 (c)(1),
(2), (4) Date: Aug. 19, 2011

(87) PCT Pub. No.: WO2013/011541
PCT Pub. Date: Jan. 24, 2013

(65) Prior Publication Data
US 2013/0024635 A1    Jan. 24, 2013

(51) Int. Cl.
*G06F 12/16* (2006.01)
(52) U.S. Cl.
USPC .................................. 711/162; 711/E12.103
(58) Field of Classification Search
USPC .......................................... 711/162, E12.103
See application file for complete search history.

(56) References Cited

U.S. PATENT DOCUMENTS

| 6,253,295 B1 | 6/2001 | Beal et al. |
| 6,857,011 B2 | 2/2005 | Reinke |
| 2004/0153616 A1* | 8/2004 | Nakamura et al. ............ 711/162 |
| 2006/0236047 A1 | 10/2006 | Shitomi |
| 2007/0050575 A1 | 3/2007 | Uratani et al. |

OTHER PUBLICATIONS

PCT International Search Report mailed on Jan. 12, 2012.
Bert Dufrasne,Teena Werley, IBM System Storage DS8000:Remote Pair FlashCopy(Preserve Mirror), Redpaper, May 6, 2009.

* cited by examiner

*Primary Examiner* — Yong Choe
(74) *Attorney, Agent, or Firm* — Volpe And Koenig, P.C.

(57) ABSTRACT

The object is to achieve a disaster recovery configuration in a short period of time. In a first storage apparatus 1P, a child-generation volume 3PB is created using a snapshot from a parent volume 3PA, and a grandchild-generation volume 3PC is created using a snapshot from the child-generation volume 3PB. Similarly, in a second storage apparatus 1S as well, a child-generation volume 3SB is created using a snapshot from a parent volume 3SA, and a grandchild-generation volume 3SC is created using a snapshot from the child-generation volume 3SB. The parent volumes form a normal remote copy pair. The child-generation volumes and the grandchild-generation volumes form virtual remote copy pairs without implementing an initial copy.

9 Claims, 21 Drawing Sheets

Fig. 8

| Mapping information T20 ||
| C20 | C21 |
| SSVOL DIR | VLU SLOT# |
| SSVOL LBA#1 | VLU#1 SLOT#11 |
| SSVOL LBA#2 | VLU#2 SLOT#24 |
| ... | ... |

Fig. 9

| Snapshot information T30 ||||
| C30 | C31 | C32 | |
| Parent volume ID | Primary snap VLU # | Secondary snap VLU # | ... |
| 32122,0,4000 | 32122,0,V001 | 32122,0,V101 | ... |
| 32122,0,4001 | 32122,0,V002 | 32122,0,V102 | ... |
| ... | ... | ... | ... |

32122,0,V002

- Storage apparatus #
- CU #
- Logical device #

Fig. 10

Remote copy information T40

| Primary volume ID (C40) | Secondary volume ID (C41) | Virtual flag (C42) | Status (C43) | BM (C44) | |
|---|---|---|---|---|---|
| 32122,0,4000 | 32213,0,6000 | 0 | PAIR0 | 000100001001100 | ... |
| 32122,0,V001 | 32213,0,V001 | 1 | SUSPEND | 100000010010000 | ... |
| 32122,0,V101 | 32213,0,V101 | 1 | PAIR | 000100000110001 | ... |
| ... | ... | ... | ... | ... | ... |

FIRST STORAGE APPARATUS AND FIRST STORAGE APPARATUS CONTROL METHOD

TECHNICAL FIELD

The present invention relates to a first storage apparatus and a first storage apparatus control method.

BACKGROUND ART

Enhancements to computer performance have made it possible to run multiple virtual computers (hereinafter, virtual machines) on a physical computer. The virtual machine executes a variety of processing by booting up an operating system that has been installed in a virtual storage device (hereinafter, the virtual hard disk drive).

Meanwhile, technology for acquiring a writable snapshot on a file system is known (Patent Literature 1). A snapshot is a still image of data at a certain point in time.

In accordance with the writable snapshot technology, difference data is generated as a result of writing to the snapshot. The difference data is stored in a separate storage area from the storage area in which the snapshot was created. The difference data storage destination is changed to this separate storage area.

In addition, technology for making the logical volume storage contents of two storage apparatuses match up is also known (Non-Patent Literature 1). This technology is premised on a case in which a copy pair is formed between a local volume A in a local storage server and a remote volume A in a remote storage server, and a copy pair is formed between a local volume B in a local storage server and a remote volume B in a remote storage server. In this technology, in a case where a Flash Copy is carried out from local volume A to local volume B, a Flash Copy is also carried out between remote volume A and remote volume B.

CITATION LIST

Patent Literature

PTL 1: U.S. Pat. No. 6,857,011

Non Patent Literature

NPL 1: http://www.redbooks.ibm.com/redpapers/pdfs/redp4504.pdf

SUMMARY OF INVENTION

Technical Problem

A disaster recovery system in preparation for an earthquake or other such natural disaster has been proposed. In a disaster recovery system, two systems having the same configuration are prepared, and the two systems are coupled via a communication network. In a case where a failure occurs in the one system causing it to stop, the other system carries out the business processing.

Therefore, in a case where multiple logical volumes are created from a base volume comprising a master OS (a golden image), and these logical volumes are respectively allocated to multiple virtual machines in the one system, the same configuration must also be disposed in the other system.

That is, other logical volumes corresponding to the respective logical volumes in the one system must respectively be disposed in the other system, and copy pairs must be respectively formed between the respective logical volumes in the one system and the respective logical volumes in the other system. In addition, all of the data stored in the one logical volume must be copied to the other logical volume for each copy pair. The copy initially performed when a copy pair is formed will be called the initial copy.

Although there will be differences in accordance the volume size and communication network speed, an initial copy executed between different systems will take time, making it difficult to construct a disaster recovery system in a short period of time. In particular, since multiple initial copies are executed in a case where logical volumes are respectively provided to multiple virtual machines, the communication network becomes increasingly congested, and it takes a long time for the disaster recovery system to be constructed. Because a virtual machine is unable to use a logical volume until the initial copy has been completed, system availability drops causing user usability to deteriorate.

In the prior art, in which a Flash Copy, which is the same as the Flash Copy in the local storage server, is executed in the remote storage server, the user must create a copy pair beforehand and associate this copy pair with the other copy pair, which constitutes the copy source, via a management computer. Therefore, in this prior art, it is impossible to construct a virtual machine environment for a disaster recovery configuration as rapidly as the situation demands.

With the foregoing problem in view, an object of the present invention is to provide a first storage apparatus and a first storage apparatus control method, which make it possible to quickly create volumes having the same content in a first storage apparatus and a second storage apparatus, and to construct remote copy pairs in a short period of time in the first storage apparatus and in the second storage apparatus. Another object of the present invention is to provide a first storage apparatus and a first storage apparatus control method, which make it possible to create a virtual remote copy pair between a snapshot volume in the first storage apparatus and a snapshot volume in the second storage apparatus without carrying out the initial copy. Yet another object of the present invention is to provide a first storage apparatus and a first storage apparatus control method, which make it possible to control a snapshot operation in the second storage apparatus in conjunction with a volume selection result with respect to multiple snapshot volumes created in multiple stages in the first storage apparatus.

Solution to Problem

A first storage apparatus related to the present invention is coupled to a second storage apparatus so as to be capable of two-way communications, and the first storage apparatus has a first controller and a first logical volume, which is controlled by the first controller, and the first controller, in a case where the second storage apparatus has a second logical volume for forming a first remote copy pair with the first logical volume when a first copy volume is created from the first logical volume, instructs a second controller of the second storage apparatus to create from the second logical volume a second copy volume that forms a second remote copy pair with the first copy volume, checks that the second copy volume has been created, and forms a second remote copy pair of the first copy volume and the second copy volume.

The first controller may determine whether or not the second storage apparatus has a second logical volume forming a remote copy pair with the first logical volume by using remote copy information that manages a remote copy, and in a case where the second storage apparatus has the second logical volume, may instruct the second controller to create from the second logical volume a second copy volume forming a second remote copy pair with the first copy volume.

The first controller may create a third copy volume from the first copy volume, instruct the second controller to create from the second copy volume a fourth copy volume forming a third remote copy pair with the third copy volume, check that the fourth copy volume has been created, and form a third remote copy pair of the third copy volume and the fourth copy volume.

The first controller may receive an instruction for selecting either the first copy volume or the third copy volume, and in a case where the first copy volume was selected, may match the storage content of the third copy volume with the storage content of the first copy volume, and, in addition, may instruct the second controller to match the storage content of the fourth copy volume with the storage content of the second copy volume. The first controller, in a case where the third copy volume was selected, may match the storage content of the first copy volume with the storage content of the third copy volume, and, in addition, may instruct the second controller to match the storage content of the second copy volume with the storage content of the fourth copy volume.

BRIEF DESCRIPTION OF DRAWINGS

FIG. 8 is a diagram showing an example of the configuration of mapping information.

FIG. 9 is a diagram showing an example of the configuration of snapshot information.

FIG. 10 is a diagram showing an example of the configuration of remote copy information.

DESCRIPTION OF EMBODIMENTS

The embodiment of the present invention will be explained below by referring to the attached drawings. However, it should be noted that this embodiment is merely one example for realizing the present invention, and does not purport to limit the technical scope of the present invention.

Figure 1:
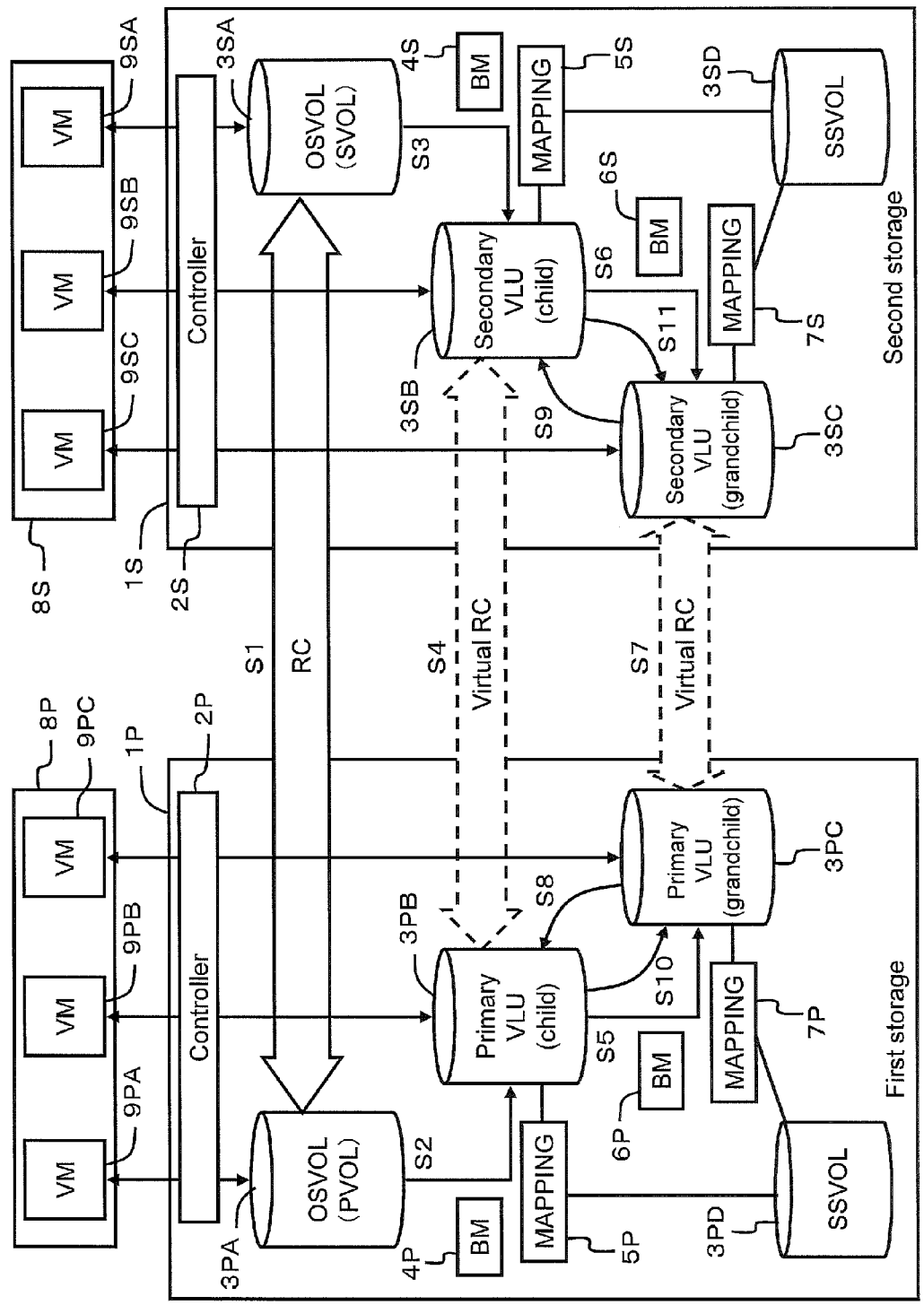
FIG. 1 is a conceptual diagram of an embodiment of the present invention.

FIG. 1 shows an overview of the entire embodiment. The computer system shown in FIG. 1, for example, comprises multiple storage apparatuses 1P and 1S, and multiple host computers 8P and 8S. As will be described further below using FIG. 2, the respective storage apparatuses 1P and 1S are coupled via a communication network to enable two-way communications. In addition, a management server may also be disposed in the computer system.

The computer system comprises a disaster recovery configuration. That is, even in a case where the storage apparatus 1P and the host computer 8P of the primary side have shut down as a result of a failure, the storage apparatus 1S and the host computer 8S of the secondary side are able to continue carrying out business processing. To achieve this kind of fault tolerance, the primary side configuration 1P and 8P and the secondary side configuration 1S and 8S are the same.

A first storage apparatus 1P is the primary storage apparatus, which constitutes the copy source. The first storage apparatus 1P, for example, comprises a controller 2P, multiple volumes 3PA, 3PB, 3PC, and 3PD, and management tables 4P, 5P, 6P and 7P.

The controller 2P, which serves as the "first controller", controls the operation of the first storage apparatus 1P. The controller 2P reads/writes data from/to the volumes 3PA, 3PB, 3PC, and 3PD in accordance with a command received from the host computer 8P.

An OS volume 3PA, which serves as the "first logical volume", is a reference volume for storing a basis operating system (OS). The OS volume 3PA is a base volume, and will also be called the parent volume. The OS volume 3PA is the primary volume, which constitutes the copy source. The copy-destination volume of the OS volume 3PA is the OS volume in the secondary storage apparatus 1S (the secondary-side parent volume) 3SA.

A virtual logical unit (hereinafter, VLU) 3PB, which serves as the "first copy volume", is created in accordance with a snapshot of the OS volume 3PA. The snapshot acquires a disk image of a copy-target volume at a prescribed point in time. Since the child-generation volume 3PB is the copy volume initially created from the OS volume 3PA, which is the base volume, this volume will be called the child-generation volume here. The child-generation volume 3PB is a primary volume constituting the copy source. The copy destination of the child-generation volume 3PB is a child-generation volume 3SB in the second storage apparatus 1S. This secondary child-generation volume 3SB is equivalent to the "second copy volume".

Management information 4P, which denotes the corresponding relationship between an address space of the OS volume 3PA, which is the copy-target volume, and an address space of the child-generation volume 3PB, for example, is created as a difference bitmap. In a case where the OS volume 3PA is updated, the pre-update data (old data) is stored in a snapshot volume (SSVOL in the drawing) 3PD, which is the volume for saving data.

A 1 is configured in the update location with respect to the difference bitmap 4P, denoting that updating has been performed. A 0 is configured in a location, which has not changed since the time the snapshot was created. The corresponding relationship between the location of the old data stored in the snapshot volume 3PD and the location inside the child-generation volume 3PB is managed in accordance with mapping information 5P.

A copy volume 3PC of the child-generation volume 3PB can also be created using a snapshot. Since this copy volume 3PC is a virtual logical unit (a logical volume) created from the child-generation volume 3PB, it will be called a grandchild-generation volume.

The grandchild-generation volume 3PC is a primary volume, which constitutes a copy source. The copy destination of the grandchild-generation volume 3PC is a grandchild-generation volume 3SC in the second storage apparatus. The primary-side grandchild-generation volume 3PC is equivalent to the "third copy volume". The secondary-side grandchild-generation volume 3SC is equivalent to the "fourth copy volume".

The grandchild-generation volume 3PC and the child-generation volume 3PB are managed in accordance with a difference bitmap 6P and mapping information 7P the same as was described with respect to the child-generation volume 3PB and the OS volume 3PA, which is the parent volume.

When data in the child-generation volume 3PB is updated, a 1 is configured in the update location inside the difference bitmap 6P. The update-target data (old data) is stored in the snapshot volume 3PD. The corresponding relationship between the old data stored in the snapshot volume 3PD and the address space in the grandchild-generation volume 3PC is managed in accordance with the mapping information 7P.

Respective virtual machines 9PA, 9PB, and 9PC disposed in the host computer 8P are coupled to the respective volumes 3PA, 3PB, and 3PC in the primary storage apparatus 1P. The respective virtual machines 9PA, 9PB, and 9PC are virtual computers created by using a portion of the computer resources (the microprocessor and memory) of the host computer 8P.

The virtual machine 9PA can read/write data from/to the OS volume 3PA. The virtual machine 9PB can read/write data from/to the child-generation volume 3PB. The virtual machine 9PC can read/write data from/to the grandchild-generation volume 3PC.

The snapshot volume 3PD, in a case where the data inside the respective volumes 3PA, 3PB and 3PC are updated, is the volume for storing the pre-update data. In the drawing, only one snapshot volume 3PD is shown, but a snapshot volume can be prepared separately for each generation.

Figure 3:
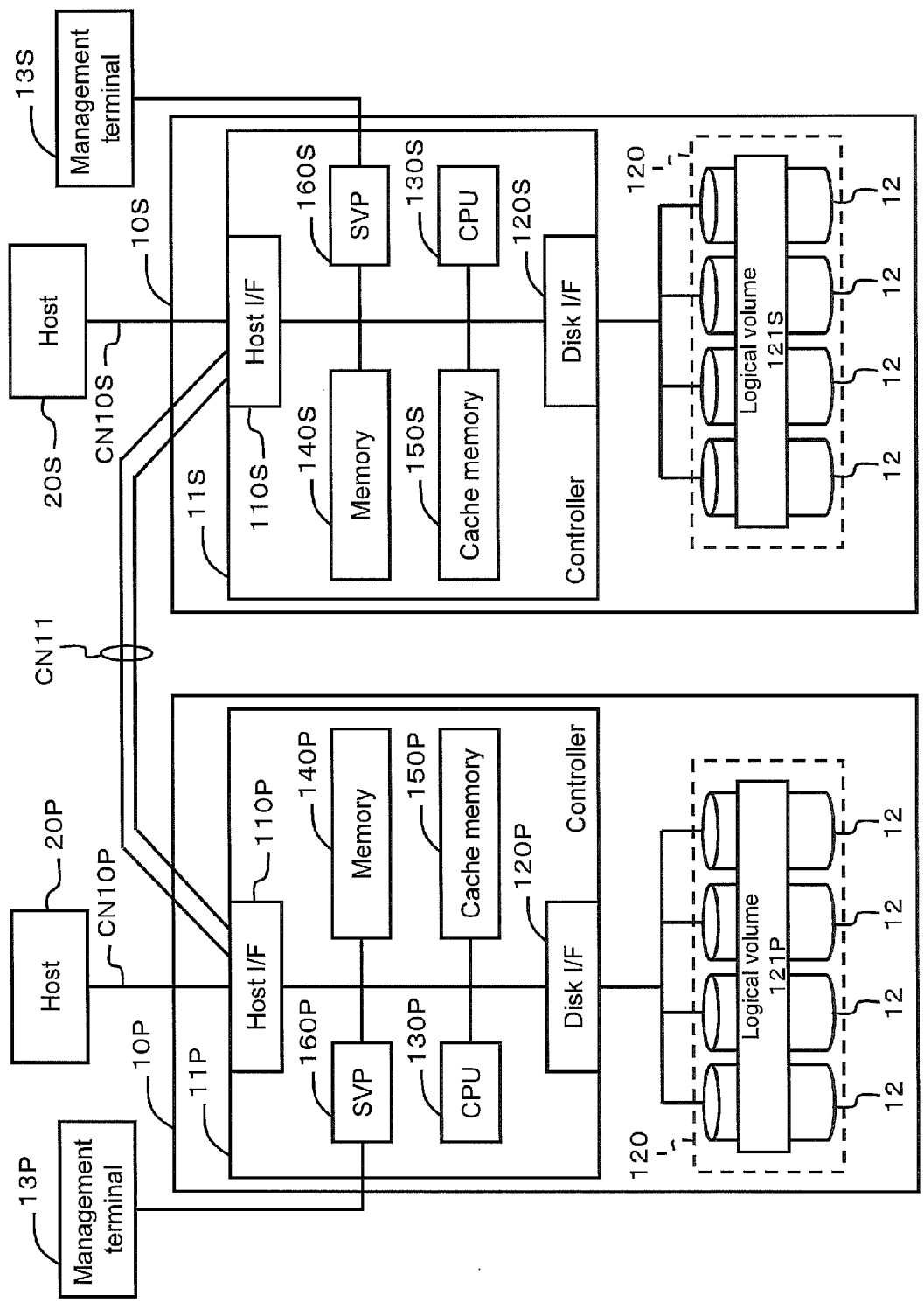
FIG. 3 is a hardware block diagram of a storage apparatus.

As will be described further below using FIG. 3, the storage apparatus comprises multiple physical storage devices 12. A logical storage area created by using the storage areas of these physical storage devices 12 will be called a logical unit or a logical volume. A logical volume created based on a physical storage area will be called an actual volume. A logical volume not created on the basis of a physical storage area will be called virtual volume. The OS volume 3PA and the snapshot volume 3PD are actual volumes. The child-generation volume 3PB and the grandchild-generation volume 3PC are virtual volumes. However, as will be explained using another example described further below, at least either one of the child-generation volume or the grandchild-generation volume can also be created as an actual volume.

The configuration of the second storage apparatus 1S will be explained. The second storage apparatus 1S is a secondary storage apparatus, which constitutes a copy destination. The second storage apparatus 1S, for example, comprises a controller 2S, multiple volumes 3SA, 3SB, 3SC, and 3SD, and management tables 4S, 5S, 6S and 7S.

The controller S2, which serves as the "second controller", controls the operation of the second storage apparatus 1S. The controller 2S reads/writes data from/to the volumes 3SA, 3SB, 3SC, and 3SD in accordance with a command received from the host computer 8S. The virtual machines 9SA, 9SB, and 9SC inside the host computer 8S read/write data from/to the respective volumes 3SA, 3SB, and 3SC.

A secondary-side OS volume 3SA corresponds to the primary-side OS volume 3PA, and the two volumes 3PA and 3SA form a remote copy pair. A secondary-side child-generation volume 3SB corresponds to the primary-side child-generation volume 3PB, and the two volumes 3PB and 3SB form a virtual remote copy pair. Similarly, a secondary-side grandchild-generation volume 3SC corresponds to the primary-side grandchild-generation volume 3PC, and the two volumes 3PC and 3SC form a virtual remote copy pair.

Virtual remote copy pair signifies a remote copy pair, which has been formed without carrying out an initial copy. That is, the method for creating a virtual remote copy pair differs from the creation method for a normal remote copy pair. In a case where data in a primary volume (a copy-source volume) has been updated, this updated data is sent and written to a secondary volume (a copy-destination volume). The virtual remote copy pair is the same as a normal remote copy pair in that the updated content of the primary volume is reflected in the secondary volume.

A synchronous method and an asynchronous method are known as methods for making the storage contents of the primary volumes 3PA, 3PB and 3PC match the storage contents of the secondary volumes 3SA, 3SB and 3SC. The synchronous method is for transferring and writing updated data to the secondary volume when the primary volume has been updated. The asynchronous method is a method in which the update timing of the primary volume is not linked to the update timing of the secondary volume.

Generally speaking, a synchronous remote copy is used in a case in which the distance between the storage apparatuses is relatively short. An asynchronous remote copy is used in a case in which the distance between the storage apparatuses is relatively long. In this embodiment, a case that uses the synchronous remote copy will be explained. However, the present invention is not limited to a synchronous remote copy; an asynchronous remote copy may also be used. In a case where an asynchronous remote copy is used, the access attribute of the primary parent volume is configured to read-only, and all of the difference data being managed by the remote copy difference bitmap is transferred and written to the secondary parent volume. A snapshot of the primary parent volume and a snapshot of the secondary parent volume may respectively be acquired in a state in which the primary parent volume data matches the secondary parent volume data.

The relationship between the parent-generation volume 3SA and the child-generation volume 3SB, the relationship between the child-generation volume 3SB and the grandchild-generation volume 3SC, and the role of the snapshot volume 3SD are the same as was explained with respect to the first storage apparatus 1P, and as such, explanations thereof will be omitted.

The operation of this embodiment will be explained. First, the secondary OS volume 3SA, which forms a remote copy pair with the primary OS volume 3PA, is disposed inside the second storage apparatus 1S. All the data stored in the primary OS volume 3PA is sent to the second storage apparatus 1S and written to the secondary OS volume 3SA. The copying of all the data, which is initially performed when a copy pair is formed, will be called the initial copy. When the initial copy is complete, a remote copy pair is formed between the primary OS volume 3PA and the secondary OS volume 3SA (S1).

In a case where a new volume is to be allocated to the virtual machine 9PB, the child-generation volume 3PB of the OS volume 3PA, which is the parent volume, is created in accordance with snapshot technology (S2). When the child-generation volume 3PB is created, the difference bitmap 4P for managing the difference(s) between the child-generation volume 3PB and the parent volume 3PA is created. In addition, the mapping information 5P, which denotes the relationship between the snapshot volume 3PD and the child-generation volume 3PB, is also created.

To maintain the disaster recovery configuration, a child-generation volume 3SB of the OS volume 3SA is automatically created inside the secondary-side storage apparatus 1S (S3). For example, the first controller 2P of the first storage apparatus 1P issues an instruction to the second controller 2S of the second storage apparatus 1S for the creation of a secondary child-generation volume 3SB for forming a remote copy pair with the primary child-generation volume 3PB. When the secondary child-generation volume 3SB is created, a difference bitmap 4S and mapping information 5S are created.

The primary child-generation volume 3PB and the secondary child-generation volume 3SB form a remote copy pair (S4). An initial copy is not performed when the remote copy pair is created between the child-generation volumes 3PB and 3SB. Therefore, to make a distinction with a normal remote copy pair in this specification, this remote copy pair will be called the virtual remote copy pair.

There is no need to carry out an initial copy because the storage content of the primary child-generation volume 3PB and the storage content of the secondary child-generation volume 3SB match. The primary parent volume 3PA, which is the creation source of the primary child-generation volume 3PB, and the secondary parent volume 3SA, which is the creation source of the secondary child-generation volume 3SB, form a synchronous remote copy pair, and the storage contents of these volumes 3PA and 3SA match one another. Therefore, the storage content of the primary child-generation volume 3PB and the storage content of the secondary child-generation volume 3SB may also be considered to match at remote copy pair formation time.

Furthermore, in order to guarantee that the storage content of the primary child-generation volume 3PB and the storage content of the secondary child-generation volume 3SB are a match, it is also possible to configure the access attribute of the primary parent volume (the OS volume) 3PA to read-only when the child-generation remote copy pair is created. The child-generation volume can be created instantly using a snapshot. In addition, as described hereinabove, the initial copy is not necessary when creating the child-generation remote copy pair. Therefore, the child-generation virtual remote copy pair can be created in a shorter period of time than the parent-generation remote copy pair.

The primary child-generation volume 3PB is allocated to the primary-side virtual machine 9PB. The secondary child-generation volume 3SB is allocated to the secondary-side virtual machine 9SB.

In addition, a volume 3PC, which is the child of the child-generation volume 3PB, can also be created and allocated to another virtual machine 9PC (S5). Since this volume 3PC is equivalent to a grandchild as seen from the OS volume 3PA, this volume 3PC will be called the grandchild-generation volume.

The grandchild-generation volume 3PC is created in accordance with a snapshot based on the child-generation volume 3PB. When the grandchild-generation volume 3PC is created, a difference bitmap 6P for managing the difference(s) between the child-generation volume 3PB and the grandchild-generation volume 3PC is created. In addition, mapping information 7P, which denotes the relationship between the grandchild-generation volume 3PC and the snapshot volume 3PD is also created.

The first storage apparatus 1P instructs the second storage apparatus 1S to create a grandchild-generation volume 3SC for forming a remote copy pair with the grandchild-generation volume 3PC. The second controller 2S of the second storage apparatus 1S creates a secondary grandchild-generation volume 3SC using a snapshot based on the secondary child-generation volume 3SB (S6). When the grandchild-generation volume 3SC is created, a difference bitmap 6S and mapping information 7S are also created. A virtual remote copy pair is created in accordance with the primary grandchild-generation volume 3PC and the secondary grandchild-generation volume 3SC (S7). The creation of the grandchild-generation remote copy pair is the same as the creation of the child-generation remote copy pair described hereinabove, and as such, an explanation will be omitted.

Furthermore, for convenience of explanation, FIG. 1 shows a case in which one child-generation volume and one grandchild-generation volume are created, but multiple child-generation volumes and multiple grandchild-generation volumes can also be provided. In addition, lower generation volumes, such as a great-grandchild-generation volume and a great-great-grandchild-generation volume, can also be created.

Now then, for example, a patch program may be applied to the operating system to enhance performance. However, the only way to learn how a patch program will work is to actually apply this patch program and see.

For example, a case in which a first patch program is applied to the child-generation volume 3PB and a second patch program is applied to the great-grandchild-generation volume 3PC will be explained. The only way to know whether either the first patch program or the second patch program is good is to actually use the volume and see.

In a case where the child-generation volume 3PB and the grandchild-generation volume 3PC have been used, and the results indicate that the performance of the child-generation volume 3PB is high, the storage content of the grandchild-generation volume 3PC is made to match the storage content of the child-generation volume 3PB (S8). Specifically, for example, a snapshot of the child-generation volume 3PB is retaken, and the grandchild-generation volume 3PC is re-created.

In conjunction with the re-creation of the primary grandchild-generation volume 3PC, the secondary grandchild-generation volume 3SC is re-created inside the second storage apparatus 1S using a snapshot based on the secondary child-generation volume 3SB (S9).

Alternatively, in a case where the performance of the grandchild-generation volume 3PC is high, the storage content of the child-generation volume 3PB is made to match the storage content of the grandchild-generation volume 3PC (S10). Specifically, for example, the child-generation volume 3PB is created as a snapshot of the grandchild-generation volume 3PC. However, for management reasons, the parent-child generational relationship does not change. The child-generation volume 3PB continues to be a child-generation volume, and does not become a grandchild-generation volume.

In conjunction with the revision of the primary child-generation volume 3PB described above, the secondary child-generation volume 3SB is revised on the basis of the secondary grandchild-generation volume 3SC (S11).

Configuring this embodiment like this makes it possible to form a remote copy pair without carrying out an initial copy, thereby enabling a disaster recovery configuration to be achieved in a shorter time than in the past. Computer system reliability is enhanced as a result.

In this embodiment, in conjunction with a volume operation inside the first storage apparatus 1P, the same volume operation can be carried out automatically inside the second storage apparatus 1S as well. Therefore, multiple virtual remote copy pairs can be created automatically without causing problems for the user, thereby enhancing user usability.

In this embodiment, the storage content of the child-generation volume can be changed to the grandchild-generation volume, or the storage content of the grandchild-generation volume can be restored to the storage content of the child-generation volume. That is, in this embodiment, in a configuration in which a snapshot is used to create a new volume (the grandchild-generation volume) based on a volume (the child-generation volume), which has also been created in accordance with a snapshot, a snapshot copy operation can be interlinked between the primary storage apparatus 1P and the secondary storage apparatus 1S. This makes it possible for the user to simply select a desired generation volume, and rapidly achieve a disaster recovery configuration that conforms to this selected generation.

Example 1

Figure 4:
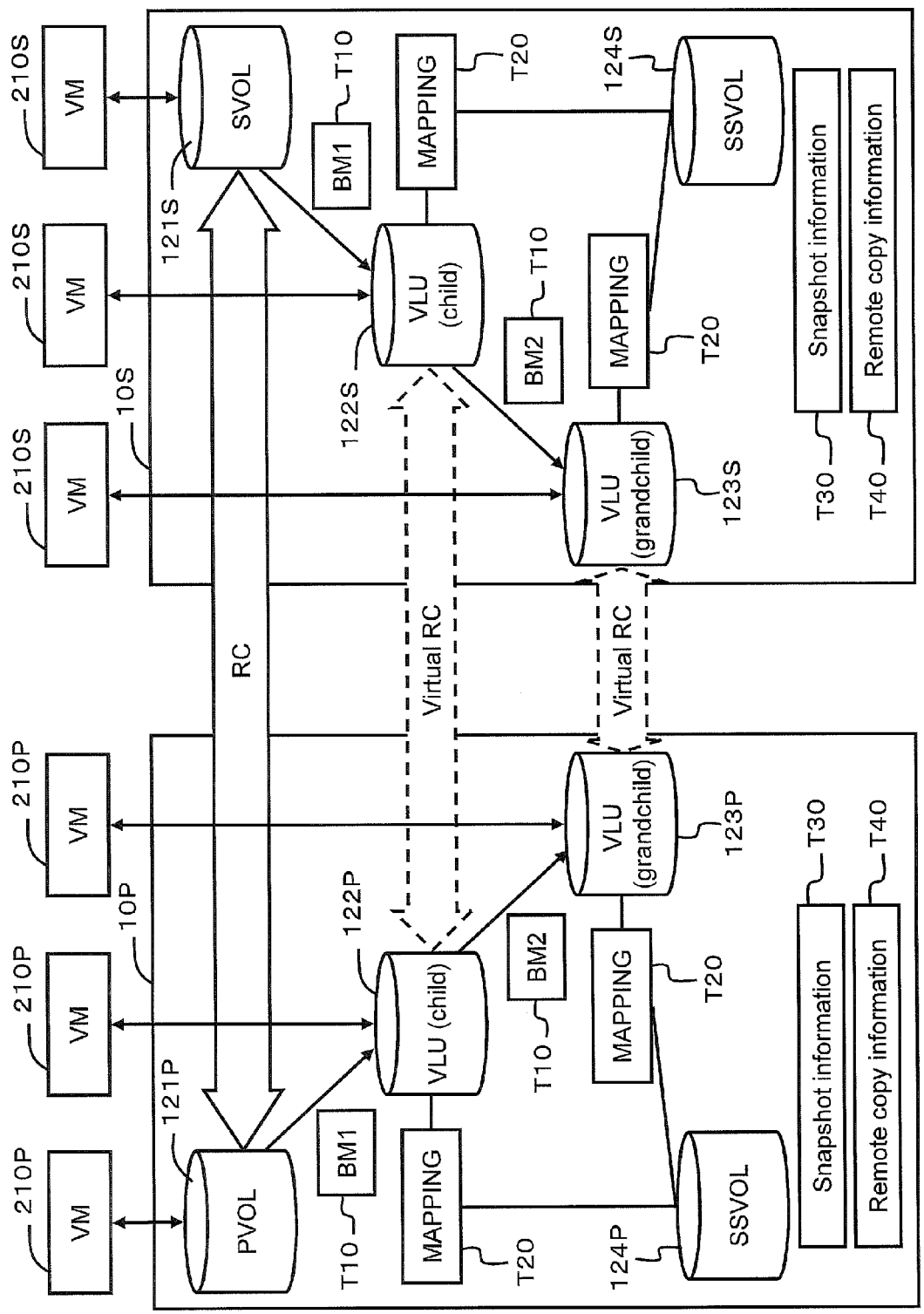
FIG. 4 is a diagram schematically showing a remote copy configuration.

A first example will be explained by referring to FIGS. 2 through 18. First, the relationship with FIG. 1 will be described. First storage apparatus 10P corresponds to the first storage apparatus 1P, second storage apparatus 10S corresponds to the second storage apparatus 1S, host computer 20P corresponds to the host computer 8P, and host computer 20S corresponds to the host computer 8S. Multiple virtual machines 210P correspond to the virtual machines 9PA through 9PC, and multiple virtual machines 210S correspond to the virtual machines 9SA through 9SC. As shown in FIG. 4, primary parent volume 121P corresponds to the parent volume 3PA, secondary parent volume 121S corresponds to the parent volume 3SA, primary child-generation volume 122P corresponds to the child-generation volume 3PB, secondary child-generation volume 122S corresponds to the child-generation volume 3SB, primary grandchild-generation volume 123P corresponds to the grandchild-generation volume 3PC, and secondary grandchild-generation volume 123S corresponds to the grandchild-generation volume 3SD. As shown in FIG. 4, difference bitmap T10 corresponds to the difference bitmaps 4P, 4S, 6P and 6S, and mapping information T20 corresponds to the mapping information 5P, 5S, 7P and 7S.

Figure 2:
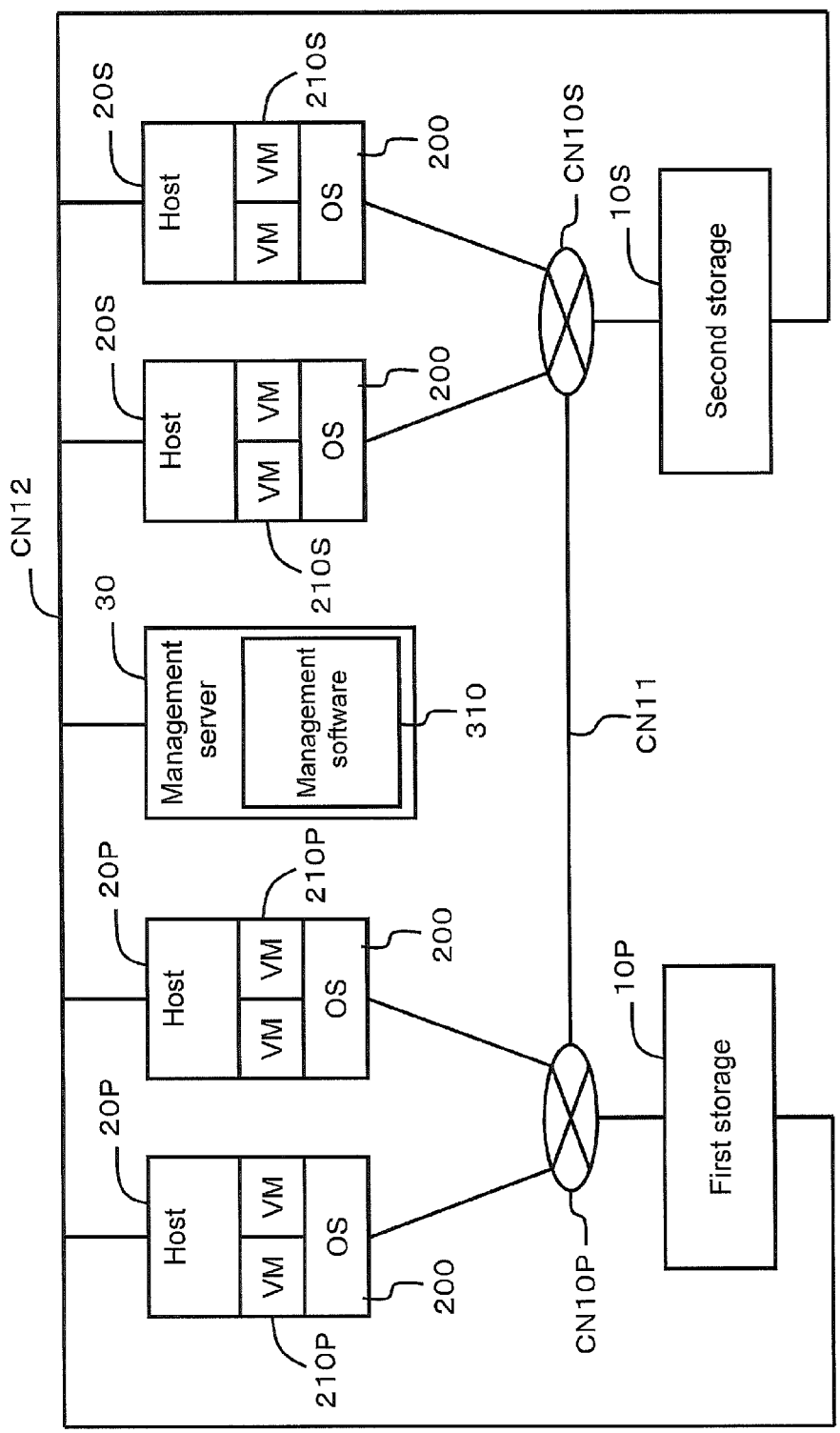
FIG. 2 is a block diagram of an entire computer system comprising a storage apparatus.

FIG. 2 is a block diagram of an entire computer system. The computer system, for example, comprises multiple storage apparatuses 10P and 10S, multiple host computers 20P and 20S, and at least one management server 30. Two sites, i.e., a primary site and a secondary site, are disposed in the computer system. By providing multiple sites in the same configuration, the computer system realizes a disaster recovery configuration. Furthermore, the primary site and the secondary site may be disposed inside the same building. A host computer and a storage apparatus are disposed at each of the sites.

At the primary site, the first storage apparatus 10P and the host computer 20P are coupled via a communication network CN10P. At the secondary site, the second storage apparatus 10S and the host computer 20S are coupled via a communication network CN10S. The communication networks CN10P and CN10S inside the respective sites are coupled via an inter-site communication network CN11.

The management server 30 is a computer for managing the computer system. The management server 30 comprises management software 310. A user can use the management software 310 to create an ordinary logical volume, configure a communication path between a host computer and a logical volume, and so forth. Furthermore, the creation of a remote copy pair, which will be described further below, is executed as internal processing in the storage apparatus. Instead of this, the below-described remote copy pair may be created in accordance with an instruction from the management server 30.

The management server 20 is coupled to the respective storage apparatuses 10P and 10S, and the respective host computers 20P and 20S via a management communication network CN12. The communication networks CN10P, CN10S, and CN11, for example, can be configured as a communication network such as an IP-SAN (Internet Protocol-Storage Area Network) or a FC-SAN (Fibre Channel-Storage Area Network). The management communication network CN12, for example, can be configured as a communication network such as a LAN (Local Area Network). The communication networks CN10P, CN10S, and CN11 may be configured as a common communication network. The management communication network CN12 may also be a configuration included in a common communication network.

The host computer 20P comprises an operating system 200, and at least one virtual machine 210P. Similarly, the host computer 20S also comprises an operating system 200, and at least one virtual machine 210S.

The hardware configuration of the storage apparatus will be explained by referring to FIG. 3. The first storage apparatus 10P and the second storage apparatus 10S comprise substantially the same configuration from the standpoint of disaster recovery. Consequently, the configuration of the first storage apparatus 10P will be explained, and an explanation of the configuration of the second storage apparatus 10S will be omitted.

The first storage apparatus 10P, for example, comprises a controller 11P, multiple physical storage devices 12, and a management terminal 13. The controller 11P will be explained in detail further below.

The storage device 12 is for storing data to be used by the host computer 20P. For example, a hard disk device, a semiconductor memory device, an optical disk device, a magneto-optical disk device, a magnetic tape device, a flexible disk device or other such device capable of reading and writing data can be used as the storage device.

In a case where a hard disk device is used as the storage device, for example, a FC (Fibre Channel) disk, a SCSI (Small Computer System Interface) disk, a SATA disk, an ATA (AT Attachment) disk, or an SAS (Serial Attached SCSI) disk can be used.

Furthermore, for example, it is also possible to use various types of storage devices, such as a flash memory, a FeRAM (Ferroelectric Random Access Memory), a MRAM (Magnetoresistive Random Access Memory), an Ovonic Unified Memory, and a RRAM (Resistance RAM). In addition, for example, the configuration may also be such that different types of storage devices are intermixed, such as a flash memory device and a hard disk device.

The physical storage areas of the multiple storage devices 12 may be managed as a group. This group is called either a RAID group 120 or a parity group 120. A logical volume 121P, which is a logical storage area, can be configured based on the grouped together physical storage areas.

The controller 11P controls all the operations of the first storage apparatus 10P. The controller 11P, for example, comprises a host interface part 110P, a disk interface part 120P, a microprocessor 130P, a memory 140P, a cache memory 150P, and a service processor (SVP) 160P.

The host interface part 110P is a communication control circuit for communicating with the host computer 20P and the second storage apparatus 10S. The first storage apparatus 10P is coupled to each host computer 20P from the host interface part 110P via the intra-site communication network CN10P. In addition, the first storage apparatus 10P is also coupled to the second storage apparatus 10S from the host interface part 110P via the inter-site communication network CN11.

The disk interface part 120P is a communication control circuit for communicating with the respective storage devices 12. The disk interface part 120P converts a logical address to a physical address, converts a physical address to a logical address, and carries out error correction.

The microprocessor 130P processes a command from the host computer 20P by reading and executing a control program stored in the memory 140P. In addition, the microprocessor 130P, as will be described further below, creates a snapshot and creates a remote copy pair. The configuration of the control program will be described further below using FIG. 5.

The memory 140P stores the control program and management information. The management information will be explained in detail further below using FIGS. 9 and 10.

The cache memory 150P temporarily stores either data received from the host computer 20P (write data) or data read from the storage device 12 (read data).

The service processor 160P either transfers an instruction inputted from the management terminal 13P to the microprocessor 130P, or sends information related to various states inside the storage apparatus 10P to the management terminal 13P. The management terminal 13P is coupled to the management server 30.

The configuration of the second storage apparatus 10S is the same as the first storage apparatus 10P. An explanation of the second storage apparatus 10S can be achieved by simply changing the letter P attached to the reference sign to S in the above explanation.

The relationship of the volumes of the respective storage apparatuses will be explained by referring to FIG. 4. A parent volume 121P, a child-generation volume 122P, a grandchild-generation volume 123P, and a snapshot volume 124P are disposed in the first storage apparatus 10P, which is the primary storage apparatus. The child-generation volume 122P is created as a snapshot of the parent volume 121P. The grandchild-generation volume 123P is created as a snapshot of the child-generation volume 122P.

The first storage apparatus 10P comprises a difference bitmap T10, mapping information T20, snapshot information T30, and remote copy information T40.

The difference bitmap T10 is management information for managing the difference(s) between a copy-target volume and a copy volume created using a snapshot. Therefore, a difference bitmap T10 is prepared for each snapshot.

The mapping information T20 is management information for managing the corresponding relationship between the address space of the respective generation volumes 122P and 123P created using a snapshot, and the data stored in the snapshot volume 124P. Therefore, mapping information T20 is prepared for each snapshot.

The snapshot information T30 is management information for managing the relationship (parent-child relationship) between the parent volume 121P and the respective generation volumes 122P and 123P. The snapshot information T30 will be explained in detail using FIG. 9.

The remote copy information T40 is management information for managing a remote copy pair disposed between the first storage apparatus 10P and the second storage apparatus 10S. The remote copy information T40 will be explained in detail using FIG. 10.

The same as was described for the first storage apparatus 10P, a parent volume 121S, a child-generation volume 122S, a grandchild-generation volume 123S, and a snapshot volume 124S are disposed in the second storage apparatus 10S, which is the secondary storage apparatus. The child-generation volume 122S is created as a snapshot of the parent volume 121S. The grandchild-generation volume 123S is created as a snapshot of the child-generation volume 122S. The second storage apparatus 10S also comprises a difference bitmap T10, mapping information T20, snapshot information T30, and remote copy information T40.

The primary parent volume 121P and the secondary parent volume 121S form a normal remote copy pair. That is, the remote copy pair is formed by copying all the data from the primary parent volume 121P and the secondary parent volume 121S.

The primary child-generation volume 122P and the secondary child-generation volume 122S form a virtual remote copy pair. That is, when creating a remote copy pair, an initial copy in which all of the data of the primary child-generation volume 122P is copied to the secondary child-generation volume 122S is not performed.

Similarly, the primary grandchild-generation volume 123P and the secondary grandchild-generation volume 123S form a second virtual remote copy pair. When creating a remote copy pair, an initial copy is not performed from the primary grandchild-generation volume 123P to the secondary grandchild-generation volume 123S.

Figure 5:
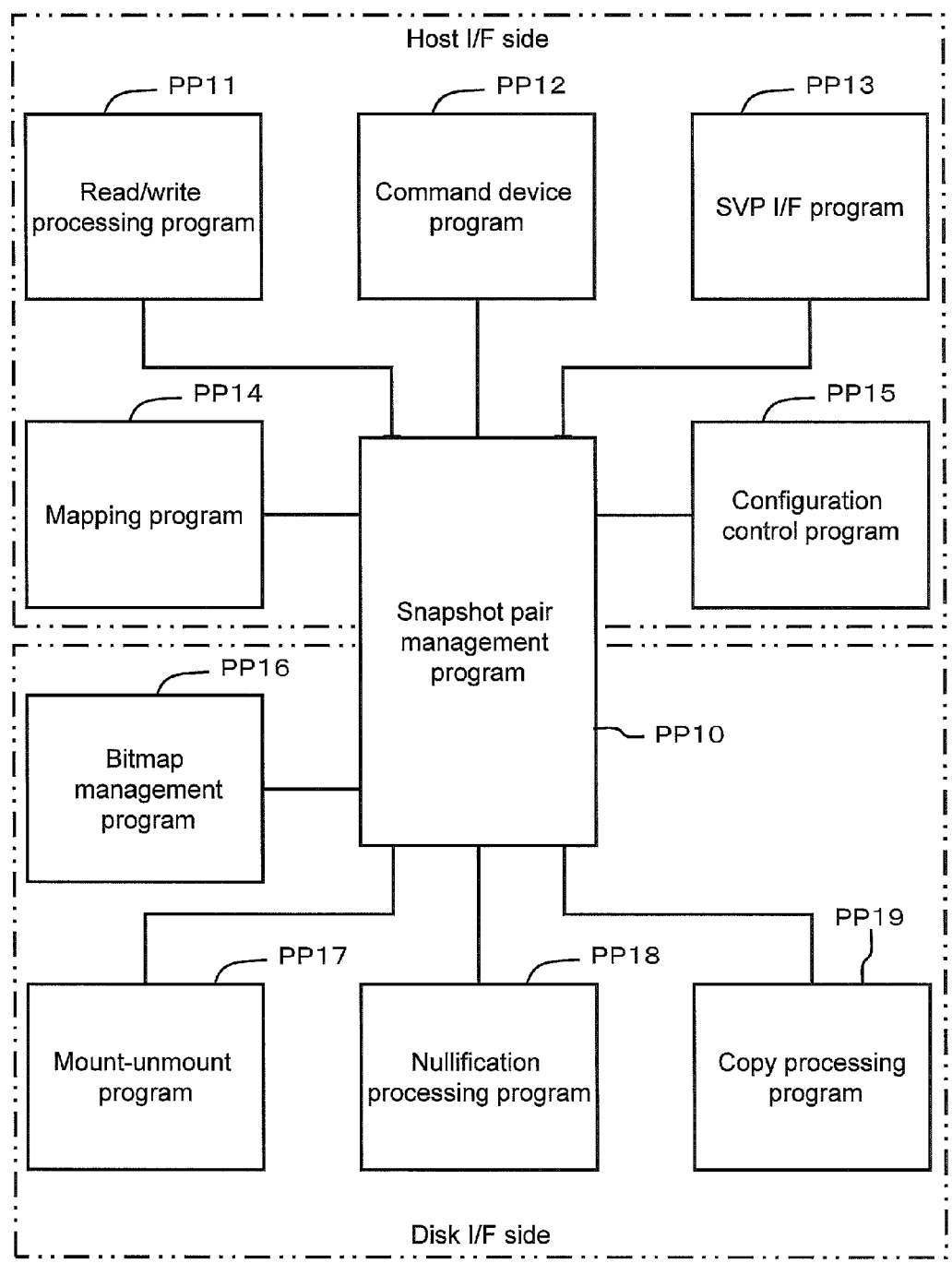
FIG. 5 is a diagram showing an example of the configuration of a computer program.

The configuration of the control program of the storage apparatus will be explained by referring to FIG. 5. The respective storage apparatuses 10P and 10S comprise control programs PP11 through PP19 as shown in FIG. 5. The control programs (program products) can be divided into programs related to processing on the host interface side, and programs related to processing on the disk interface side. A snapshot pair management program PP10 for forming a remote copy pair between copy volumes configured using snapshots is related to the processing on both sides.

The programs related to processing on the host interface side, for example, are a read/write processing program PP11, a command device program PP12, a service processor interface program PP13, a mapping program PP14, and a configuration control program PP15.

The programs related to processing on the disk interface side, for example, are a bitmap management program PP16, a mount/unmount program PP17, a nullification processing program PP18, and a copy processing program PP19.

The read/write processing program PP11 is a program for processing a read command and a write command received from the host computer, and sending the result of this processing to the command-source host computer.

The command device program PP12 is for managing a dedicated device for receiving a command from the host computer.

The service processor interface program PP13 is for controlling the service processor 160P (or 160S).

The mapping program PP14 is for managing the relationship between a virtual volume and an actual volume. The mapping program PP14 converts the data of each generation volume created in accordance with a snapshot to actual data.

The configuration control program PP15 is for managing the volume configuration inside the storage apparatus. The configuration control program PP15 manages the snapshot configuration and the relationship between the volumes.

The bitmap management program PP16 is for managing a difference bitmap to be used in accordance with a snapshot and a remote copy.

The mount/unmount program PP17 is for connecting each generation volume and the snapshot volume corresponding thereto, and for releasing a connection.

The nullification processing program PP18 is for nullifying a snapshot. The copy processing program PP19 is for controlling a remote copy.

Figure 6:
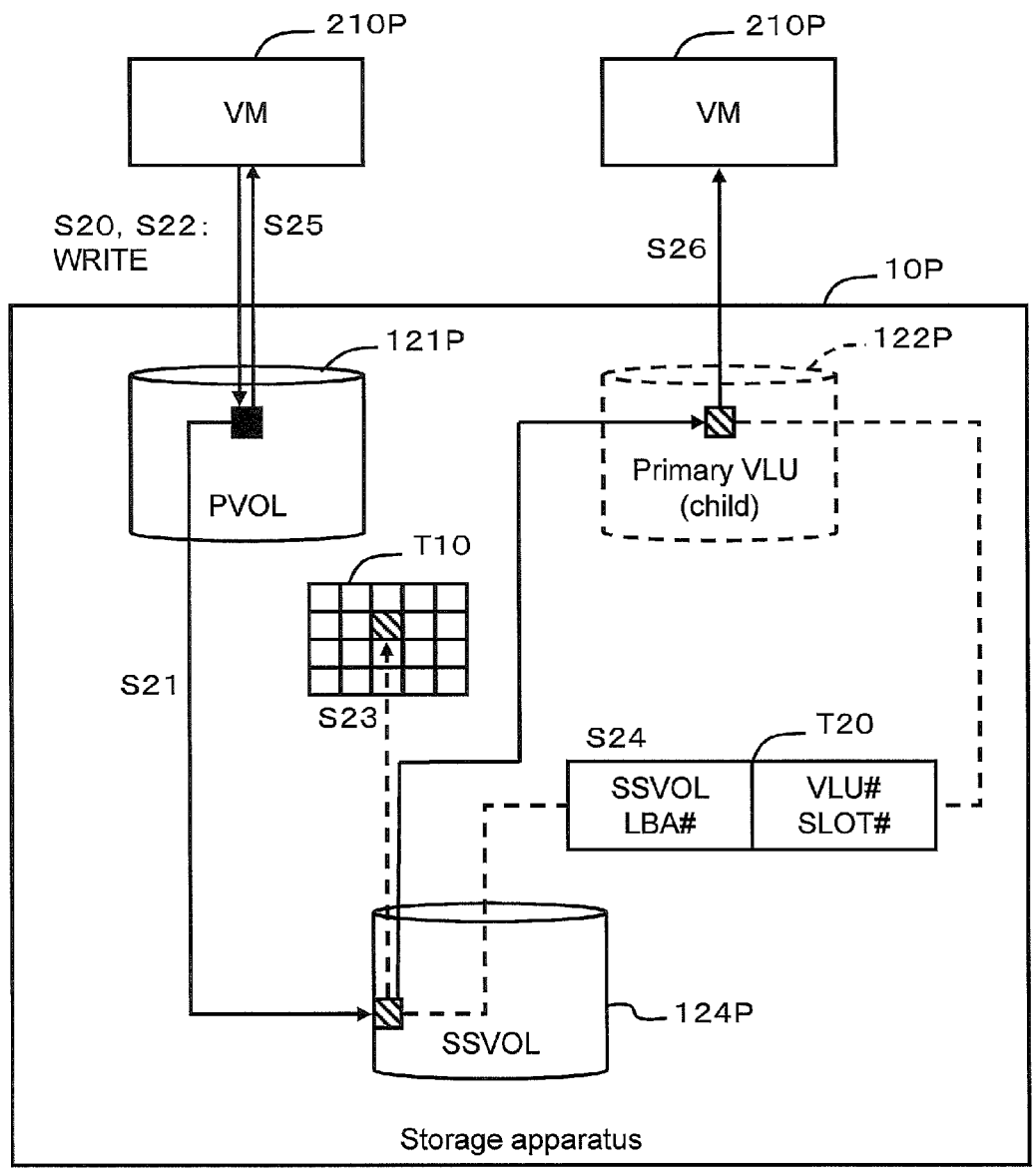
FIG. 6 is a diagram showing the operation of a snapshot volume.

The operation of each generation volume created in accordance with a snapshot will be briefly explained by referring to FIG. 6. For convenience of explanation, the explanation will focus on the child-generation volume 122P of the first storage apparatus 10P.

When the virtual machine 210P attempts to write data to the parent volume 121P (S20), the data (old data) stored in write-target area is copied to the snapshot volume 124P (S21). The storage apparatus 10P writes the write data received from the virtual machine 210P to the parent volume 121P (S22).

In accordance with the parent volume 121P having been updated, a difference occurs between the parent volume 121P and the child-generation volume 122P. The bit corresponding to the update-target area is changed from 0 to 1 in the difference bitmap T10 (S23).

The relationship between the location of the old data saved to the snapshot volume 124P and the location corresponding to the old data within the address space of the child-generation volume 122P is managed by the mapping information T20 (S24). The mapping information T20 is configured by associating the logical address inside the snapshot volume 124P with the slot number of the child-generation volume 122P.

A case in which the host computer reads data from the storage apparatus will be explained. In a case where the host computer reads data stored in the parent volume 121P, the host computer may read the data from the parent volume 121P by specifying a read-target address (S25). A special process is not required.

In a case where the host computer reads the data of the child-generation volume, the difference bitmap T10 is referenced. The data of the area in the difference bitmap T10 in which 0 has been configured is stored in the parent volume 121P. Therefore, the data is read from the parent volume 121P with respect to the area in which 0 is configured in the difference bitmap T10. Alternatively, the data of the area in the difference bitmap T10 in which 1 has been configured is stored in the snapshot volume 124P. Therefore, the data is read from the snapshot volume 124P with respect to the area in which 1 is configured in the difference bitmap T10 by referring to the mapping information T20 (S26).

Figure 7:
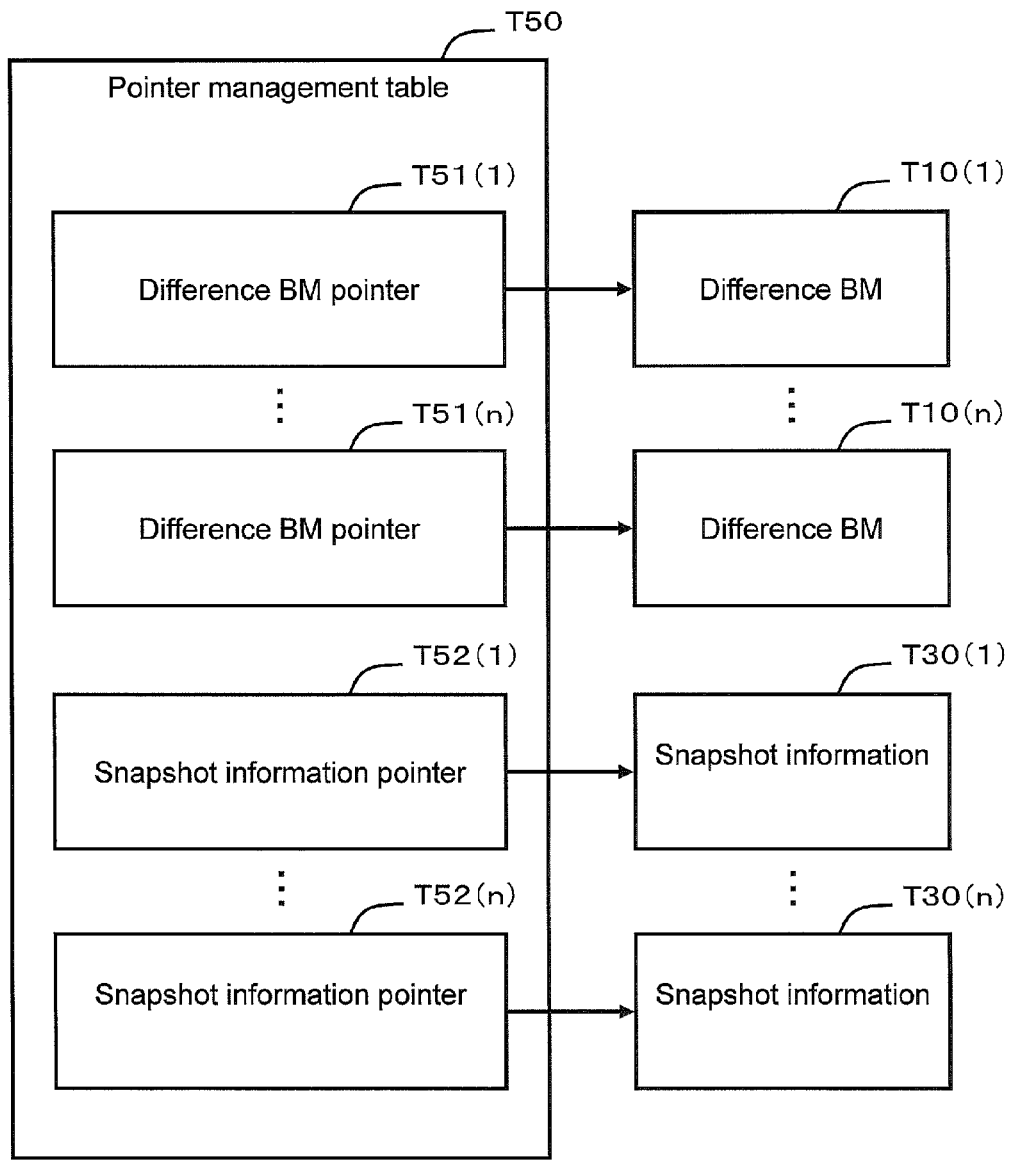
FIG. 7 is a diagram showing a difference bitmap and snapshot information for managing a snapshot.

The memory configuration for managing multiple snapshots will be explained by referring to FIG. 7. The same as above, the explanation will focus on the first storage apparatus 10P, but the second storage apparatus 10S is the same.

A pointer management table T50 for managing multiple snapshots is stored in the memory 140P of the controller 11P. The pointer management table T50 comprises multiple pointers T51 and other multiple pointers T52.

The multiple pointers T51(1) through T51(n) are for indicating the locations of multiple difference bitmaps T10. The other multiple pointers T52(1) through T52(n) are for indicating the locations of multiple pieces of snapshot information T30. The storage apparatus of this example is able to create and manage multiple snapshots like this.

The configuration of the mapping information T20 will be explained by referring to FIG. 8. The mapping information T20, for example, correspondingly manages a location C20 in a snapshot volume and a location C21 in a generation volume created in accordance with a snapshot. The location C20 inside the snapshot volume, for example, is identified in accordance with a logical address. The location C21 in the generation volume, for example, is identified in accordance with a generation volume number and a slot number. In FIG. 8, it appears that multiple generation volumes may be associated with one snapshot volume. Instead of this, the configuration may be such that a snapshot volume is prepared for each generation volume.

The configuration of the snapshot information T30 will be explained by referring to FIG. 9. The snapshot information T30, for example, comprises a parent volume identifier C30, a child-generation volume number C31, and a grandchild-generation number C32. In addition, the configuration may also be such as to enable the management of a great-grandchild-generation volume or a great-great-grandchild-generation volume.

In FIG. 9, the child-generation volume is described as a primary snap VLU number, and the grandchild-generation volume is described as a secondary snap VLU number. Primary snap VLU signifies a volume that was first created from the parent volume 121P using a snapshot. Secondary snap VLU signifies a volume that was first created using a snapshot from a child-generation volume.

The parent volume identifier C30 is information for identifying the parent volume 121P, which is the base volume. FIG. 4 shows a case in which only one parent volume 121P is provided, but as shown in FIG. 9, multiple parent volumes can also be disposed inside the storage apparatus. Then, a child-generation volume and a grandchild-generation volume can be created and allocated to a virtual machine for each parent volume 121P.

Information for identifying a volume, as shown in FIG. 9, for example, can be created by combining a storage apparatus number, a control unit number, and a logical device number. The storage apparatus number is information for identifying a storage apparatus in the computer system. The control unit number is information showing which controller is executing control in a case where multiple controllers are disposed inside the storage apparatus. The logical device number is a serial number assigned in logical volume creation sequence. The "V" included in the logical device number denotes the volume has been virtually created using snapshot technology.

The configuration of the remote copy information T40 will be explained by referring to FIG. 10. The remote copy information T40, for example, comprises a primary volume identifier C40, a secondary volume identifier C41, a virtual flag C42, a status C43, and a difference bitmap C44.

The primary volume identifier C40 is information for identifying the volume that is the copy source within a remote copy pair. The secondary volume identifier C41 is information for identifying the volume that is the copy destination within a remote copy pair. The primary volume identifier C40 and the secondary volume identifier C41 are configured the same as was described using FIG. 9.

The virtual flag C42 is identification information for distinguishing whether or not a remote copy pair is a virtual remote copy pair. A 1 is configured with respect to a virtual remote copy pair, and a 0 is configured with respect to a normal remote copy pair.

The virtual remote copy pair comprises a virtual volume (child-generation volume, grandchild-generation volume) created using a snapshot. The snapshot-created virtual volume only comprises data of an area that has actually been updated inside the snapshot volume. Therefore, the actual amount of data of a copy pair is not constant, but rather fluctuates. Alternatively, since a normal remote copy pair is configured using normal volumes, the amount of data of the copy pair is constant.

In addition, a snapshot-created virtual volume is linked to a snapshot acquisition-target volume, and does not actually hold all of the data stored in the virtual volume. A remote copy pair, which uses a snapshot-created virtual volume, differs from a normal remote copy pair, and comprises a technical feature such that an initial copy is not performed, and, in addition, the amount of data also fluctuates. Consequently, in this example, a virtual flag is configured with respect to a virtual remote copy pair, making it clear that this remote copy pair differs from a normal remote copy pair.

From this standpoint, the virtual flag, for example, can be expressed as either "identification information denoting a remote copy pair, which comprises a virtual volume that differs from a normal volume" or "identification information denoting a virtual remote copy pair, which comprises a snapshot-created virtual volume".

The status C43 shows the status of the remote copy pair. The status, for example, may be "PAIR", denoting that a pair is in the process of being formed (being synchronized), "SUSPEND", denoting a pair that has been suspended temporarily, or "ERROR", denoting that a failure has occurred.

The difference bitmap C44 is management information for managing the difference data between a primary volume (the copy-source volume) and a secondary volume (the copy-destination volume), which occurred during a remote copy. With respect to data that is only written to the primary volume and has yet to be written to the secondary volume, a 1 is configured in the bit corresponding to this location. In a case where this data is written to the secondary volume, the bit is changed from 1 to 0.

Figure 11:
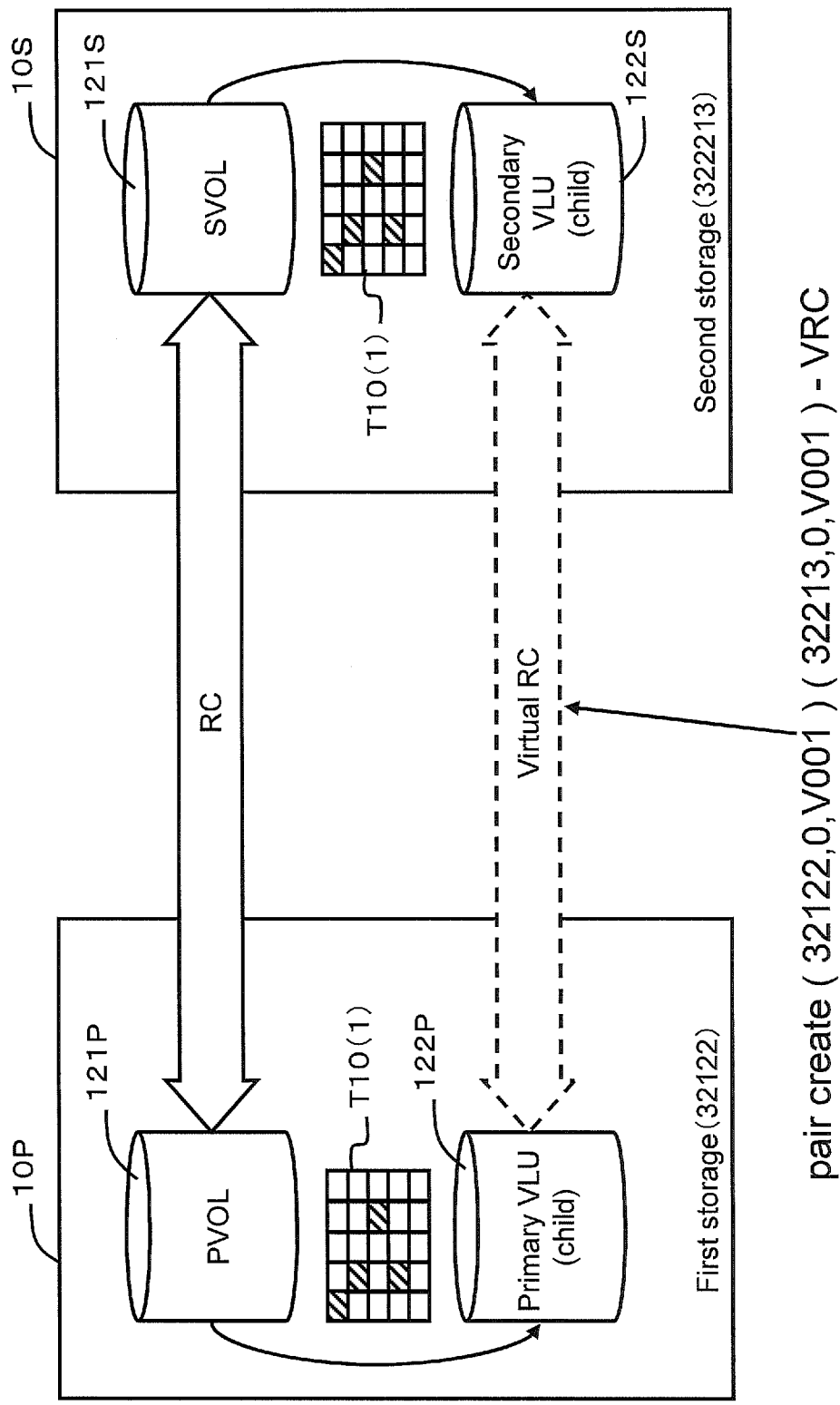
FIG. 11 is an illustration showing an example of a command when creating a virtual remote copy pair and the result thereof.

A case in which a remote copy pair is formed using a snapshot will be briefly explained by referring to FIG. 11. The premise will be that the primary parent volume 121P in the first storage apparatus 10P and the secondary parent volume 121S in the second storage apparatus 10S have formed a remote copy pair, and the storage contents of the two volumes 121P and 121S match.

In the first storage apparatus 10P, when the primary child-generation volume 122P is created from the primary parent volume 121P using a snapshot, a difference bitmap T10 and mapping information T20 are also created at the same time as this. In the drawing, only the difference bitmap T10 is shown.

When the primary child-generation volume 122P is created, a command (pair create) for forming a remote copy pair is sent from the first storage apparatus 10P to the second storage apparatus 10S. This command, as shown in the bottom part of FIG. 11, for example, comprises information specifying the primary volume (32122, 0, V001), information specifying the secondary volume (32213, 0, V001), and information denoting a virtual remote copy.

The second storage apparatus 10S, which received the above-mentioned command, creates a secondary child-generation volume 122S from the secondary parent volume 121S using a snapshot the same as was executed in the first storage apparatus 10P. The second storage apparatus 10S notifies the first storage apparatus 10P that a secondary child-generation volume 122S has been created.

The first storage apparatus 10P and the second storage apparatus 10S register a remote copy pair comprising the primary child-generation volume 122P and the secondary child-generation volume 122S in the remote copy information T40 as a virtual remote copy pair.

Figure 12:
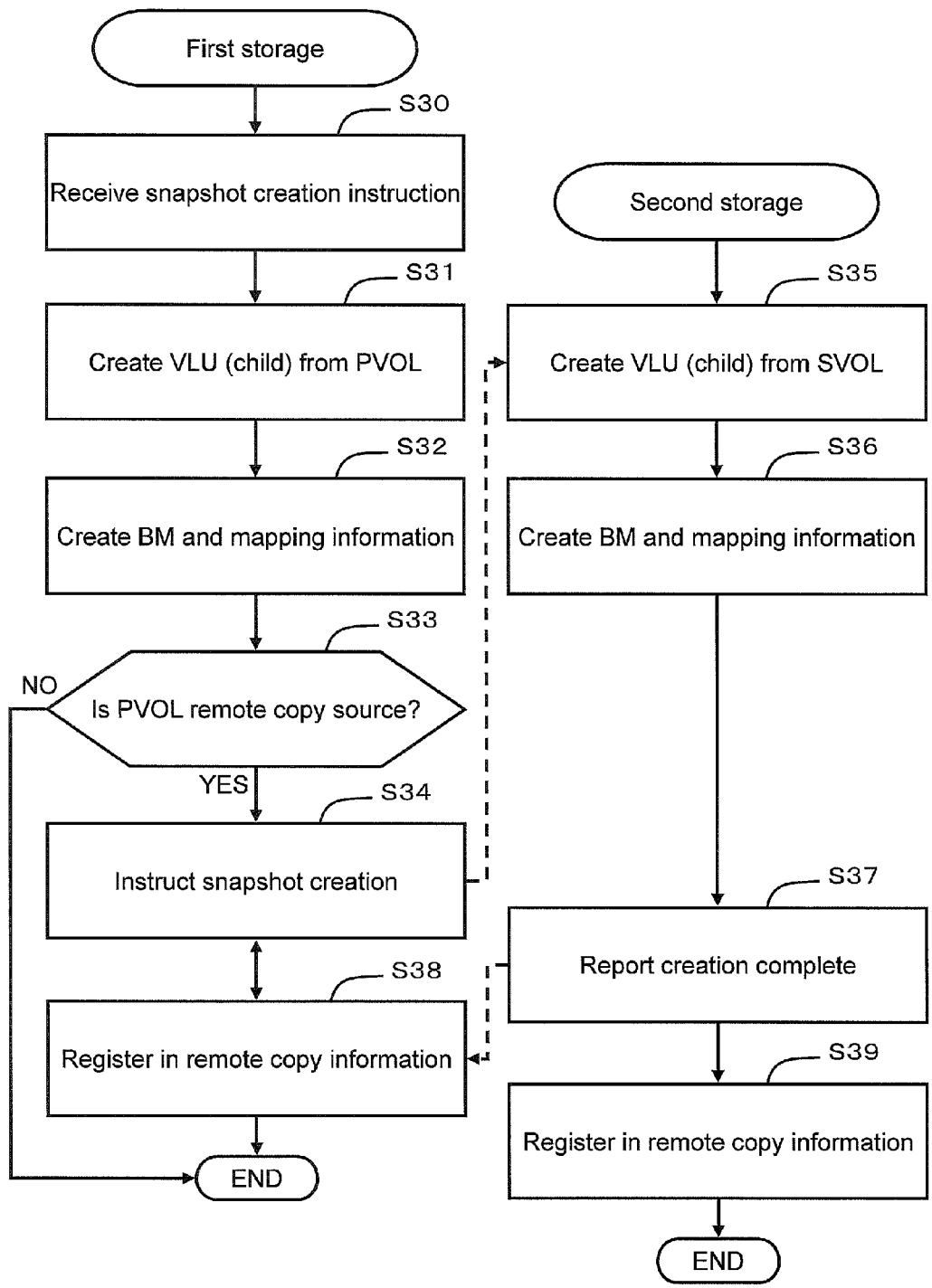
FIG. 12 is a flowchart showing a process for creating a primary first-order snapshot volume, and creating a virtual remote copy pair comprising this primary first-order snapshot volume.

FIG. 12 is a flowchart showing a process for creating a virtual remote copy pair from child-generation volumes. The respective processes described hereinbelow are realized by the microprocessor inside the controller executing a prescribed control program. Therefore, the entity performing the processing operation may be any of the storage apparatus, the controller, the microprocessor, or the control program. For the sake of convenience, the explanation here will treat the storage apparatus controller as the doer of the action.

The first controller 11P of the first storage apparatus 10P receives a snapshot creation instruction from the host computer 20P (S30). The first controller 11P uses a snapshot to create a child-generation volume 122P from the parent volume 121P (S31).

Furthermore, in a case where a child-generation volume 122P is created using a snapshot and a remote copy pair of child-generation volumes is created, the access attribute of the primary parent volume 121P may be configured to read-only. This makes it possible to prevent the storage content of the primary parent volume 121P from changing until the child-generation virtual remote copy pair is formed.

The configuration may also be such that since a case in which only one child-generation virtual remote copy pair is created does not take much time, the access attribute of the parent volume 121P is configured to read-only in a case where multiple virtual remote copy pairs are to be created.

The first controller 11P creates management information, such as a difference bitmap T10 and mapping information T20, needed for managing the child-generation volume 122P (S32). The first controller 11P determines whether or not the parent volume 121P is the remote copy source by referring to the remote copy information T40 (S33).

In a case where the parent volume 121P is the remote copy source (S33: YES), the first controller 11P instructs the second controller 11S of the second storage apparatus 10S to create a secondary child-generation volume 122S for forming a remote copy pair with the primary child-generation volume 122P (S34). An example of the specific instruction of S34 is as was explained using FIG. 11.

In a case where the parent volume 121P is not the remote copy source (S33: NO), this processing ends.

The second controller 11S, upon receiving the snapshot creation instruction from the first controller 11P, creates a secondary child-generation volume 122S using a snapshot from the secondary parent volume 121S (S35). The second controller 11S creates the management information, such as a difference bitmap T10 and mapping information T20, necessary to manage the secondary child-generation volume 122S (S36). The second controller 11S reports the creation of the secondary child-generation volume 122S to the first controller 11P (S37).

The first controller 11P receives the report from the second controller 11S, and registers a remote copy pair comprising the primary child-generation volume 122P and the secondary child-generation volume 122S in the remote copy information T40 (S38). The second controller 11S also registers the remote copy pair of the child-generation volumes in the remote copy information T40 inside the second controller 11S (S39).

In this example, in a case where a snapshot-target volume (parent volume) forms a remote copy pair like this, a volume corresponding to the volume created using a snapshot (child-generation volume) is automatically created inside the second storage apparatus and a remote copy pair is formed.

The primary parent volume 121P and the secondary parent volume 121S form a remote copy pair, and the storage contents of the two parent volumes is synchronized. Therefore, the storage content of the primary child-generation volume 122P created using a snapshot from the primary parent volume 121P should match the storage content of the secondary child-generation volume 122S created using a snapshot from the secondary parent volume 121S. Therefore, no trouble whatsoever occurs when a remote copy pair is formed in accordance with the primary child-generation volume 122P and the secondary child-generation volume 122S without carrying out an initial copy.

However, a virtual remote copy pair is formed using virtual volumes created using snapshots, and the actual data only partially exists inside the snapshot volumes 124P and 124S. That is, a snapshot-created child-generation volume is merely a disk image of a certain instant of the parent volume, and does not actually store all of the data. The child-generation volume simply holds the data of an updated area. Therefore, the data size of the volumes that form a virtual remote copy pair is not constant, and will fluctuate in accordance with updating.

Figure 13:
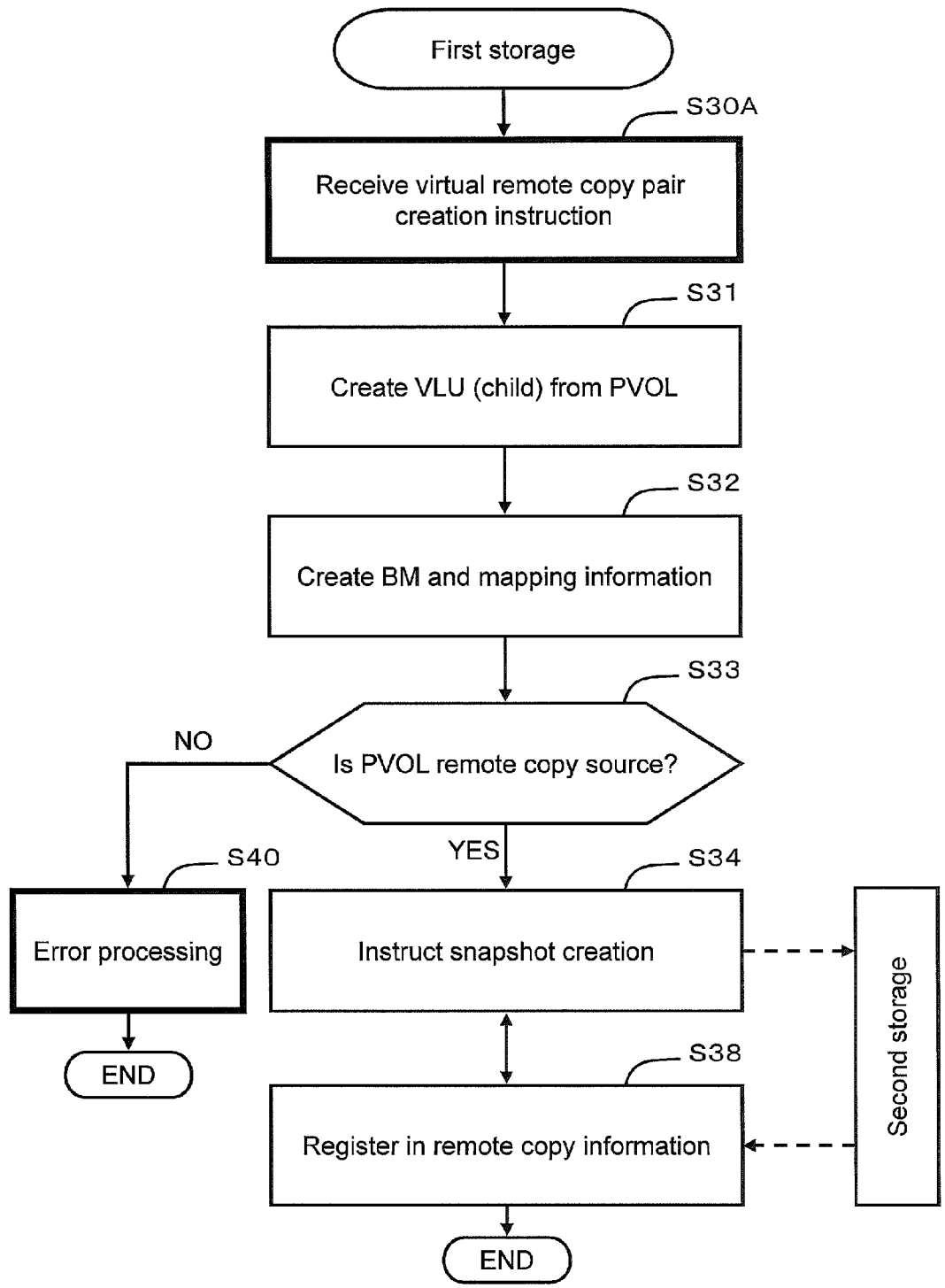
FIG. 13 is a flowchart showing a variation of the processing of FIG. 12.

FIG. 13 is a variation of the processing of FIG. 12. The flowchart shown in FIG. 12 describes a case in which the first controller 11P acquires a snapshot creation instruction from the host computer 20P. Instead of this, the first controller 11P may receive an instruction for creating a virtual remote copy pair comprising the child-generation volume 122P of the parent volume 121P from the host computer 20P (S30A).

When it is determined that the specified parent volume 121P is not the remote copy source in this case (S33: NO), error processing is performed (S40). In the error processing, for example, an error message such as "Child-generation virtual remote copy pair cannot be created because specified volume does not form the copy pair" can be outputted.

Figure 14:
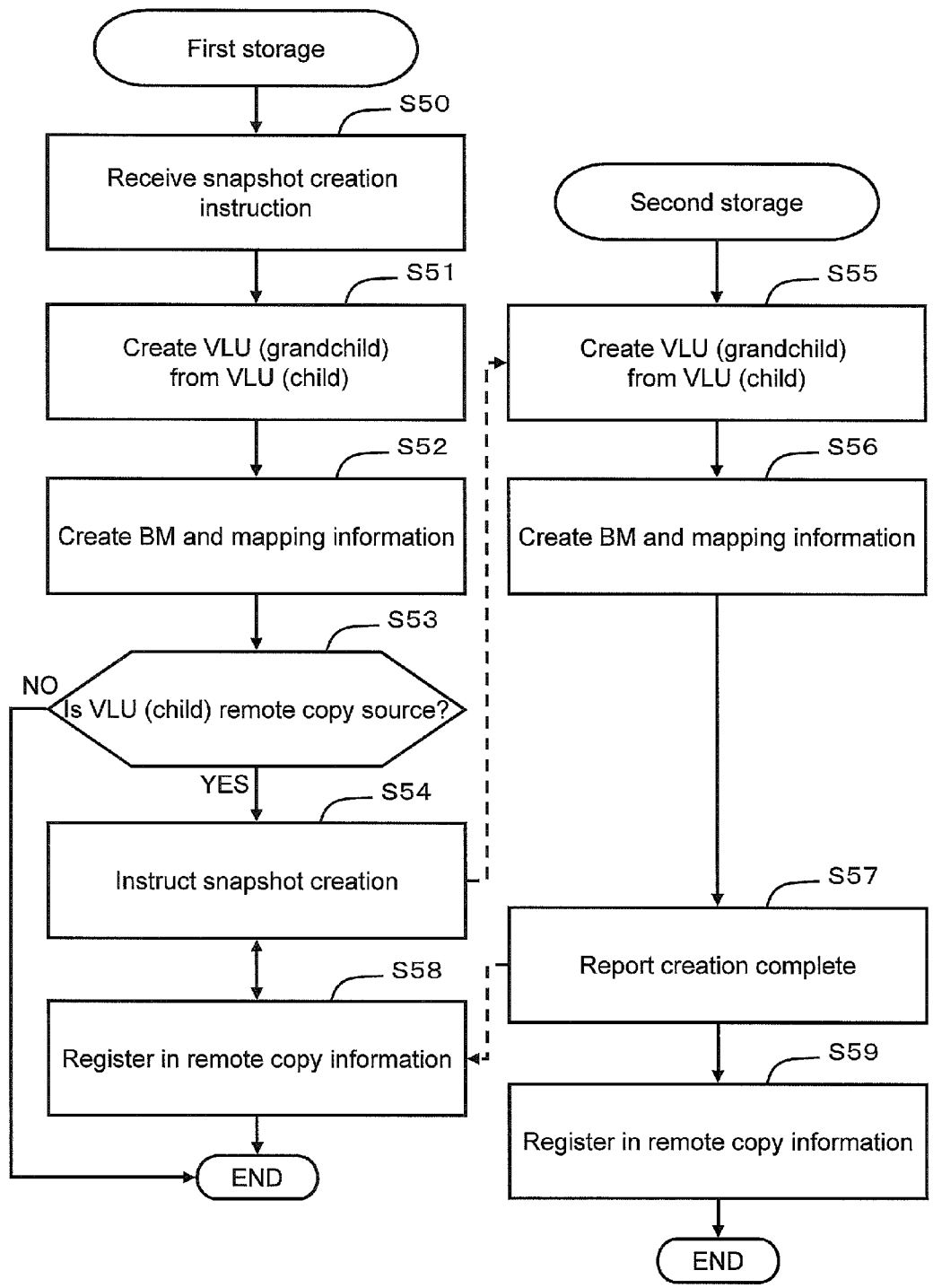
FIG. 14 is a flowchart showing a process for creating a primary second-order snapshot volume, and creating a virtual remote copy pair comprising this primary second-order snapshot volume.

FIG. 14 is a flowchart showing a process for creating a virtual remote copy pair from grandchild-generation volumes. This process is the same as the case in which a virtual remote copy pair is created from the child-generation volumes described using FIG. 12.

The first controller 11P of the first storage apparatus 10P receives a snapshot creation instruction from the host computer 20P (S50). The configuration may also be such that instead of S50 a command for instructing the creation of a child-generation volume 122P-based virtual remote copy pair is received from the host computer as described using FIG. 13.

The first controller 11P uses a snapshot to create a grandchild-generation volume 123P from the child-generation volume 122P (S51). In addition, the first controller 11P creates the management information, such as a difference bitmap T10 and mapping information T20, needed to manage the grandchild-generation volume 123P (S52).

The first controller 11P refers to the remote copy information T40 and determines whether or not the child-generation volume 122P is the remote copy source (S53).

In a case where the child-generation volume 122P is the remote copy source (S53: YES), the first controller 11P instructs the second controller 11S of the second storage apparatus 10S to create a secondary grandchild-generation volume 123S for forming a remote copy pair with the primary grandchild-generation volume 123P (S54).

In a case where the child-generation volume 122P is not the remote copy source (S53: NO), this processing ends.

The second controller 11S, upon receiving the snapshot creation instruction from the first controller 11P, creates a secondary grandchild-generation volume 123S using a snapshot from the secondary child-generation volume 122S (S55). The second controller 11S creates the management information, such as a difference bitmap T10 and mapping information T20, necessary to manage the secondary grandchild-generation volume 123S (S56). The second controller 11S reports the creation of the secondary grandchild-generation volume 123S to the first controller 11P (S57).

The first controller 11P receives the report from the second controller 11S, and registers a remote copy pair comprising the primary grandchild-generation volume 123P and the secondary grandchild-generation volume 123S in the remote copy information T40 (S58). The second controller 11S also registers the remote copy pair of the grandchild-generation volumes in the remote copy information T40 inside this second controller (S59).

Figure 15:
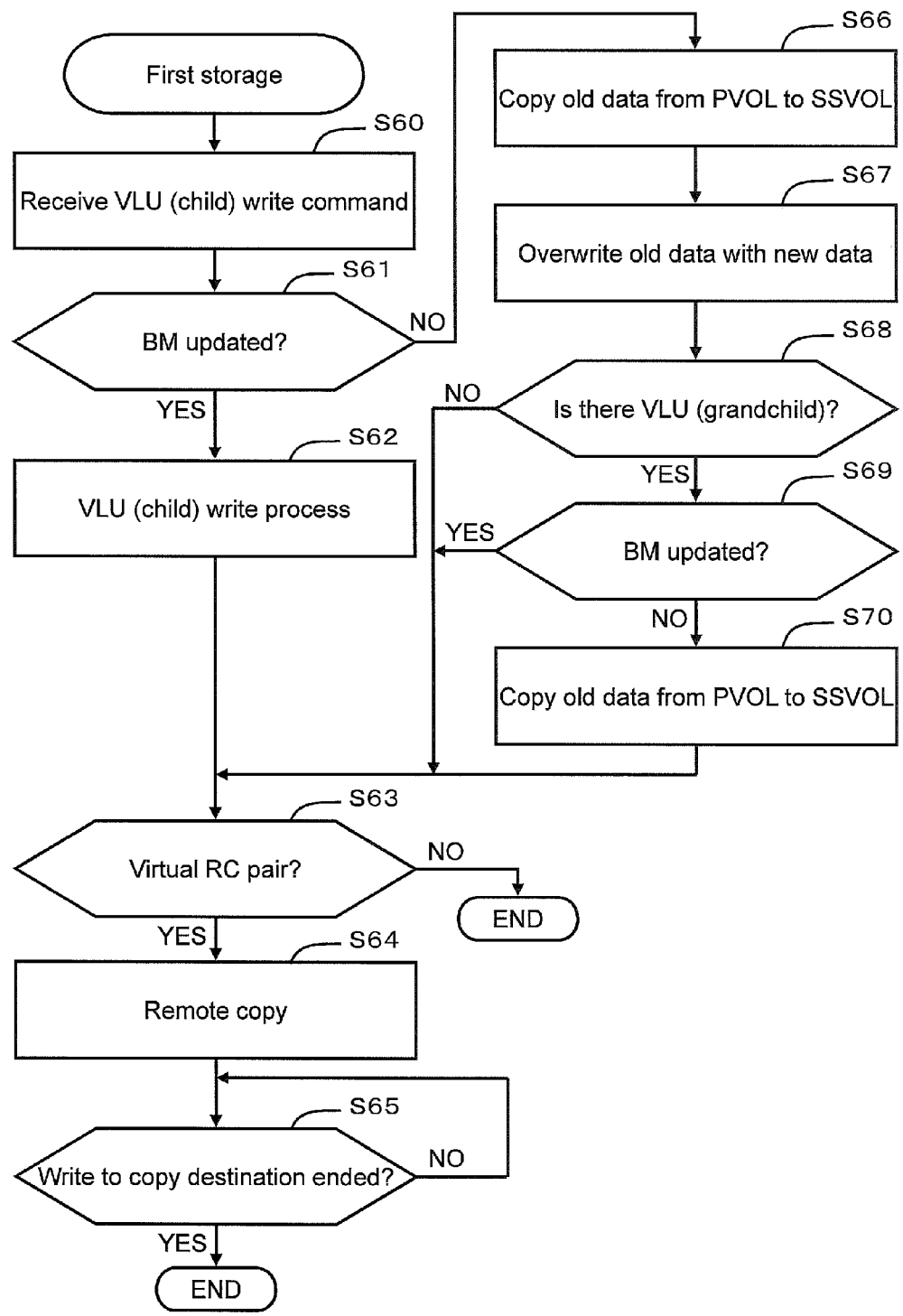
FIG. 15 is a flowchart showing a process for writing data to the primary first-order snapshot volume.

A write process to the primary child-generation volume 122P will be explained by referring to FIG. 15. The first controller 11P receives a write command with respect to the primary child-generation volume 122P from the host computer 20P (S60).

The first controller 11P refers to the difference bitmap T10 corresponding to the write-target child-generation volume 122P and determines whether the write-target area has been updated (S61). Updated signifies that the bit corresponding to the write-target area (the difference bit) has been changed from 0 to 1 in the difference bitmap T10. The fact that the bit in the difference bitmap T10 has been configured to 1 signifies that the data of the area corresponding to this bit is stored in the snapshot volume 124P.

Consequently, in a case where the write-target area difference bit has been changed to 1 (S61: YES), the first controller 11P executes a write process with respect to the primary child-generation volume 122P (S62).

Since the write-target data actually resides inside the snapshot volume 124P, the first controller 11P overwrites the data stored in the snapshot volume 124P with the data received from the host computer 20P (S62).

Next, the processing moves to the remote copy process. The first controller 11P determines whether or not the write-target child-generation volume 122P forms the virtual remote copy pair (S63). In a case where the child-generation volume 122P does not form the virtual remote copy pair (S63: NO), this processing ends. For example, in a case where the remote copy pair has been temporarily dissolved, the difference data is managed by a difference bitmap C44 for managing a remote copy. When the pair is formed once again, the difference data is transferred from the primary child-generation volume 122P and written to the secondary child-generation volume 122S.

In a case where the child-generation volume 122P forms the virtual remote copy pair (S63: YES), the first controller 11P executes a remote copy process (S64). Specifically, the first controller 11P sends a remote copy command and data to the second controller 11S (S64). The second controller 11S receives the remote copy instruction from the first controller 11P, and writes the data to the secondary child-generation volume 122S. In accordance with this, the storage content of the primary child-generation volume 122P and the storage content of the secondary child-generation volume 122S match. The first controller 11P ends this processing upon receiving a remote-copy-complete report from the second controller 11S (S65: YES).

Alternatively, in a case where the bit corresponding to the host computer 20P write-target area in the difference bitmap T10 has not been updated (561: NO), the first controller 11P copies prescribed old data from the parent volume 121P to the snapshot volume 124P (S66).

That is, the first controller 11P reads the old data of the write-target area from the parent volume 121P, and saves this old data in the snapshot volume 124P. Furthermore, the first controller 11P updates the difference bitmap T10, and, in addition, associates the old data stored in the snapshot volume 124P with the primary child-generation volume 122P (S66).

The first controller 11P overwrites the old data stored inside the snapshot volume 124P with the write data received from the host computer 20P in S60 (S67).

The first controller 11P, by referring to the snapshot information T30, determines whether or not a grandchild-generation volume 123P related to the write-target primary child-generation volume 122P exists (S68). In a case where the grandchild-generation volume 123P does not exist (S68: NO), the first controller 11P moves to S63.

In a case where the grandchild-generation volume 123P exists (S68: YES), the first controller 11P refers to the difference bitmap T10, which manages the difference between the child-generation volume 122P and the grandchild-generation volume 123P, and determines whether or not 1 is configured in the difference bit of the write-target area (S69). In a case where the prescribed difference bit is configured to 1 (S69: YES), the first controller 11P moves to S63.

In a case where the prescribed bit of the difference bitmap T10 has not been updated, that is, a case in which a 0 is configured in the prescribed difference bit (S69: NO), the first controller 11P reads the old data of the write-target area from the parent volume 121P, and stores this old data in the snapshot volume 124P (S70).

Furthermore, the first controller 11P changes the prescribed difference bit to 1, and, in addition, associates the old data stored in the snapshot volume 124P with the primary grandchild-generation volume 123P (S70).

Figure 16:
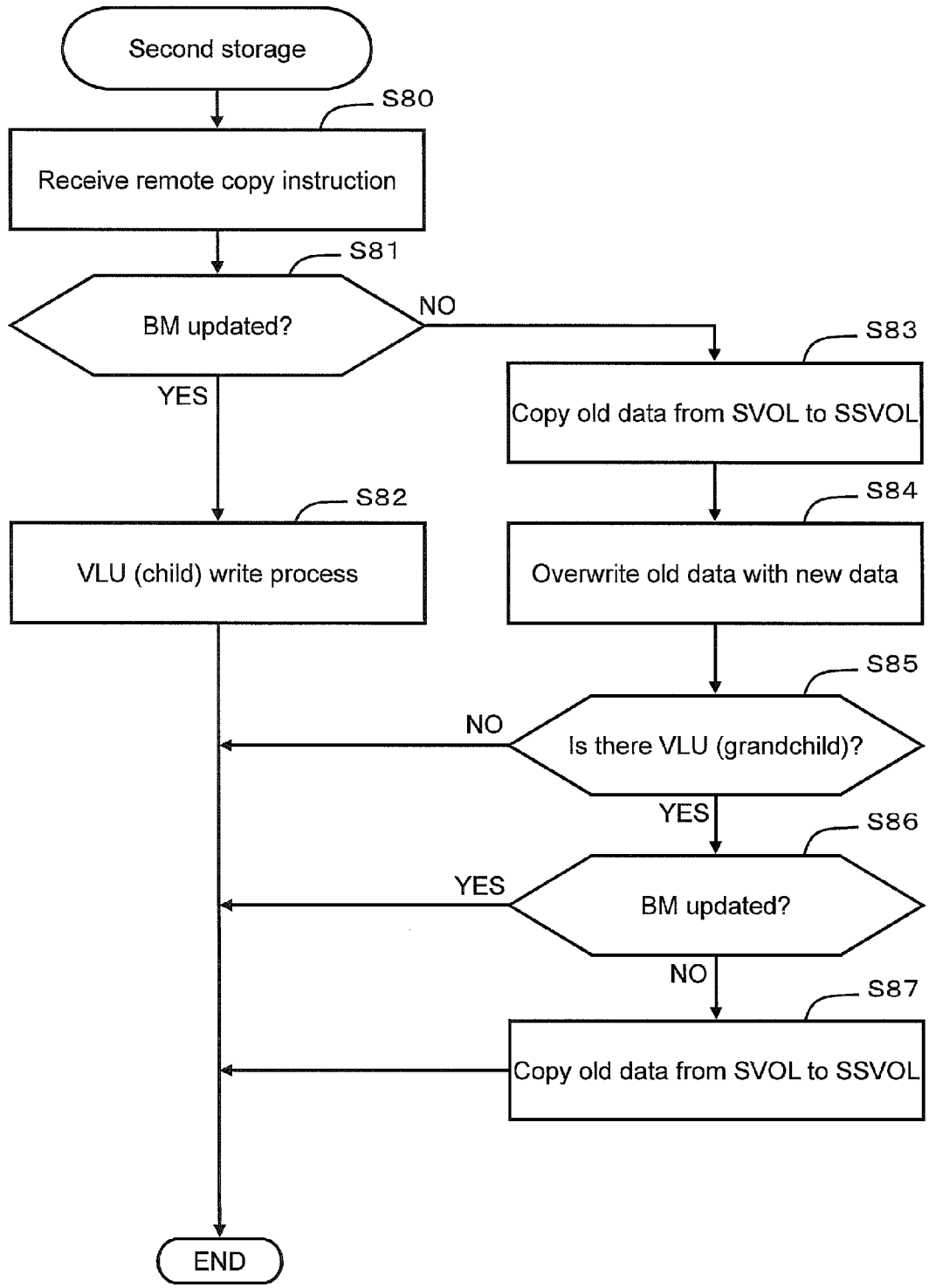
FIG. 16 is a flowchart showing a remote copy operation in a second storage apparatus.

A write process with respect to a secondary child-generation volume 122S will be explained by referring to FIG. 16. The second controller 11S, upon receiving a remote copy instruction from the first controller 11P (S80), determines whether or not a 1 is configured in the difference bit corresponding to the write-target area in the difference bitmap T10 (S81). That is, the second controller 11S determines whether the old data of the write-target area has been copied to the snapshot volume 124S from the secondary parent volume 121S, and the prescribed bit of the difference bitmap T10 has been updated as a result of this.

In a case where the difference bitmap T10 has been updated (S81: YES), the second controller 11S overwrites the old data stored in the snapshot volume 124S with the data received from the first controller 11P (S82).

Alternatively, in a case where the difference bitmap T10 has not been updated (S81: NO), the second controller 11S copies old data of the write-target area from the secondary parent volume 121S to the snapshot volume 124S (S83). Furthermore, the second controller 11S updates the difference bitmap T10, and, in addition, uses the mapping information T20 to associate the old data stored in the snapshot volume 124S with the secondary child-generation volume 122S (S83).

The second controller 11S overwrites the old data stored in the snapshot volume 124S with the data received from the first controller 11P (S84).

The second controller 11S refers to the snapshot information T30, and determines whether or not a secondary grandchild-generation volume 123S has been created from the secondary child-generation volume 122S (S85).

In a case where a secondary grandchild-generation volume 123S has not been created from the remote copy-destination child-generation volume 122S (S85: NO), this processing ends.

In a case where a secondary grandchild-generation volume 123S exists (S85: YES), the second controller 11S determines whether or not a prescribed bit in the difference bitmap T10, which manages the difference between the child-generation volume 122S and the grandchild-generation volume 123S, has been updated (S86).

In a case where the prescribed bit of the difference bitmap T10 has been updated (S86: YES), this processing ends. In a case where the prescribed difference bit has not been updated (S86: NO), the second controller 11S copies the old data from the secondary parent volume 121S to the snapshot volume 124S, and associates the storage-destination area of the old data with an area of the secondary grandchild-generation volume 123S (S87). In addition, the second controller 11S changes the prescribed difference bit from 0 to 1 in the difference bitmap T10 corresponding to the secondary grandchild-generation volume 123S (S87).

Figure 17:
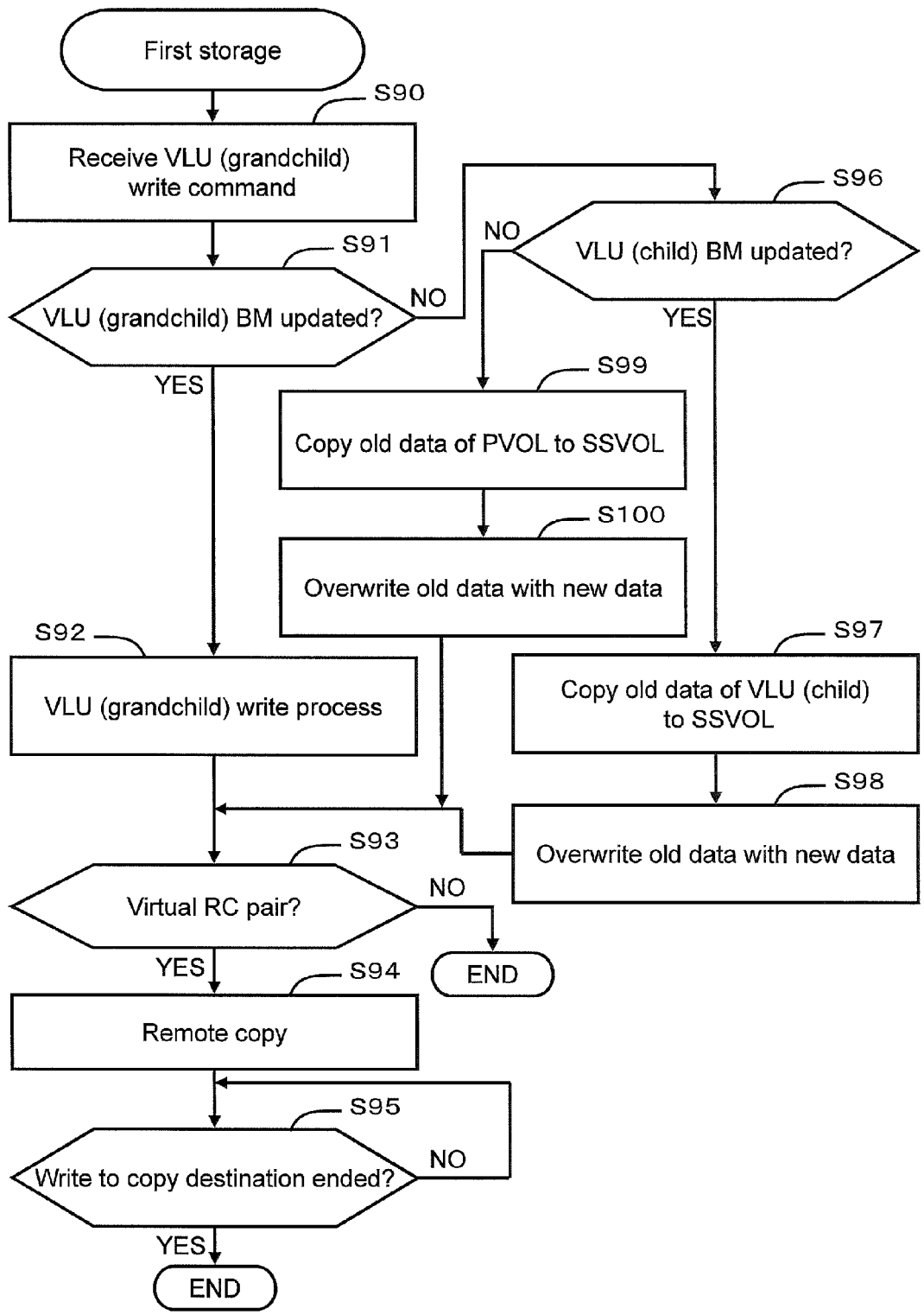
FIG. 17 is a flowchart showing a process for writing data to a primary second-order snapshot volume.

A write process with respect to a primary grandchild-generation volume 123P will be explained by referring to FIG. 17. The first controller 11P receives a write command with respect to the primary grandchild-generation volume 123P from the host computer 20P (S90).

The first controller 11P refers to the difference bitmap T10 corresponding to the primary grandchild-generation volume 123P, and determines whether or not a 1 is configured in a prescribed difference bit corresponding to the write-target area (S91).

In a case where a 1 is configured in the prescribed difference bitmap (S91: YES), the first controller 11P overwrites the old data stored in the snapshot volume 124P with the data received from the host computer 20P (S92).

The first controller 11P determines whether or not the primary child-generation volume 122P is included in the remote copy pair, that is, whether or not the primary child-generation volume 122P is the remote copy source (S93). In a case where the primary child-generation volume 122P is not the remote copy source (S93: NO), this processing ends.

In a case where the primary child-generation volume 122P is the remote copy source (S93: YES), the first controller 11P carries out a remote copy process (S94). The first controller 11P instructs the second controller 11S to transfer the data written in the primary child-generation volume 122P (more accurately, the new data overwritten in the snapshot volume 124P) and write this data to the secondary child-generation volume 122S.

The first controller 11P ends this processing upon receiving a write-complete notification from the second controller 11S (S95: YES).

Alternatively, in a case where the prescribed difference bit is not configured to 1 in the difference bitmap T10 of the grandchild-generation volume 123P (S91: NO), the first controller 11P refers to the difference bitmap T10 corresponding to the primary child-generation volume 122P. The first controller 11P determines whether or not a 1 is configured in the difference bit corresponding to the write-target area in this difference bitmap T10 (S96).

A case in which a 1 is configured in the difference bit (S96: YES) signifies that update-target old data exists in the primary child-generation volume 122P. Therefore, the first controller 11P copies the old data of the primary child-generation volume 122P to the snapshot volume 124P corresponding to the primary grandchild-generation volume 123P, and changes the prescribed difference bit to 1 (S97).

Step S97 will be explained in detail. The first controller 11P reads the old data of the primary child-generation volume 122P from a prescribed area of the snapshot volume 124P corresponding to the primary child-generation volume 122P. In addition, the first controller 11P stores this read date in another prescribed area of the snapshot volume 124P corresponding to the primary grandchild-generation volume 123P. In addition, the first controller 11P changes the difference bit corresponding to the write-target area from 0 to 1 in the difference bitmap T10 corresponding to the primary grandchild-generation volume 123P.

The first controller 11P overwrites the old data stored in the snapshot volume 124P with the new data received from the host computer 20P (S98).

Alternatively, in a case where the prescribed difference bit corresponding to the write-target area is configured to 0 in the difference bitmap T10 corresponding to the primary child-generation volume 122P (S96: NO), the update-target old data exists in the primary parent volume 121P.

Consequently, the first controller 11P copies the old data of the primary parent volume 121P to the snapshot volume 124P corresponding to the primary grandchild-generation volume 123P, and changes the prescribed difference bit to 1 (S99). In addition, the first controller 11P uses the mapping information T20 to affiliate the area of the snapshot volume 124P, which is the data copy destination, with an area of the primary grandchild-generation volume 123P (S99).

The first controller 11P overwrites the old data stored in the snapshot volume 124P with the new data received from the host computer 20P (S100).

Figure 18:
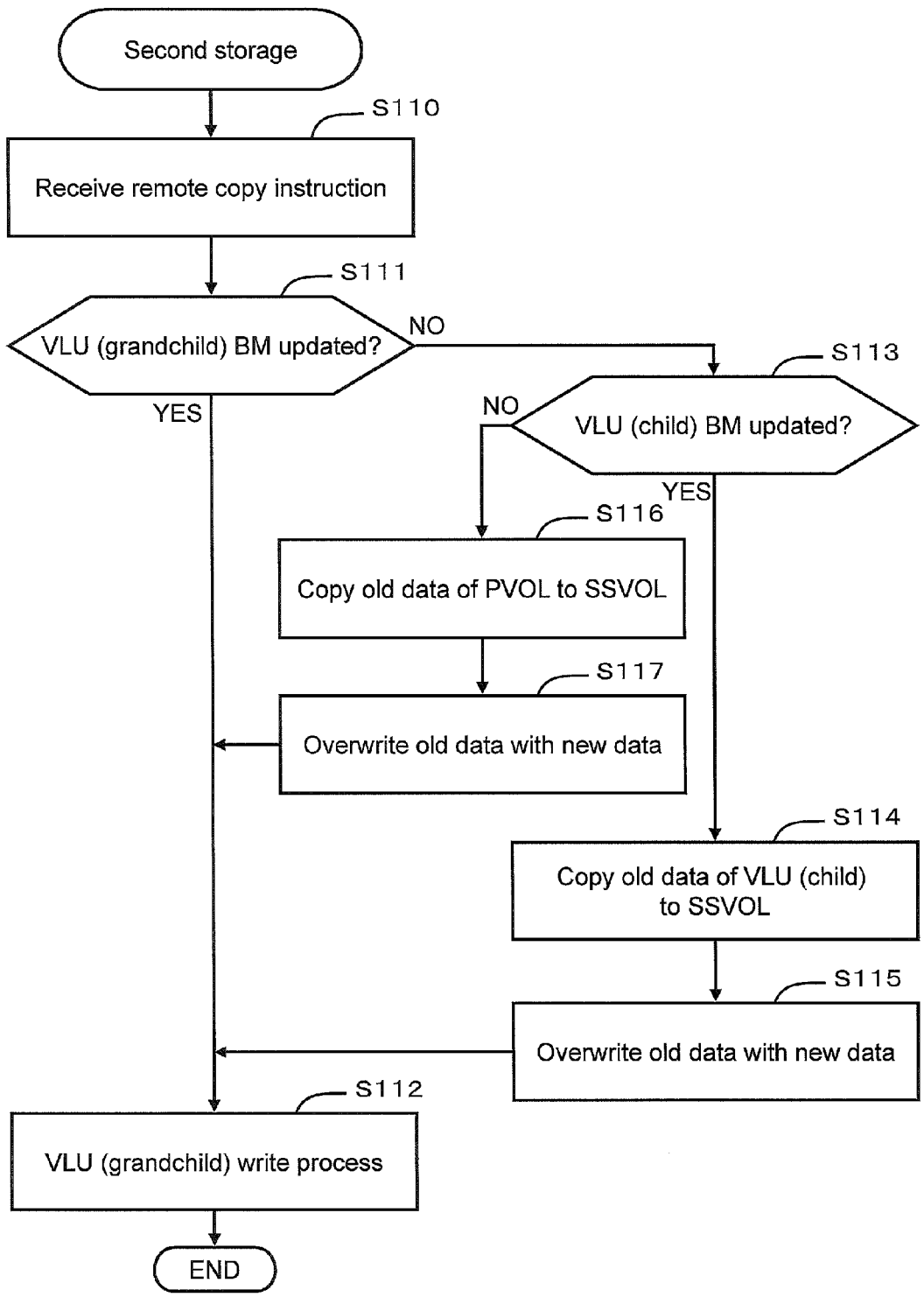
FIG. 18 is a flowchart showing a remote copy operation in the second storage apparatus.

A write process with respect to a secondary grandchild-generation volume 123S will be explained by referring to FIG. 18. The second controller 11S receives a remote copy command and remote copy-target data from the first controller 11P (S110).

The second controller 11S refers to the difference bitmap T10 corresponding to the secondary grandchild-generation volume 123S, and determines whether or not a 1 is configured in a prescribed difference bit corresponding to the update-target area (the write-target area) (S111).

A case in which a 1 is configured in the difference bit (S111: YES) signifies that old data to be written over with remote copy-target data is stored in the snapshot volume 124S corresponding to the secondary grandchild-generation volume 123S.

Therefore, the second controller 11S overwrites the old data stored in the snapshot volume 124S with the remote copy-target data received from the first controller 11P (S112).

In a case where the prescribed difference bit is configured to 0 in the difference bitmap T10 corresponding to the secondary grandchild-generation volume 123S (S111: NO), the second controller 11S refers to the difference bitmap T10 corresponding to the secondary child-generation volume 122S. This is to check the storage location of the old data to be updated.

The second controller 11S determines whether the prescribed difference bit corresponding to the update-target area is configured to 1 in the difference bitmap T10 corresponding to the secondary child-generation volume 122S (S113).

In a case where the prescribed difference bit related to the secondary child-generation volume 122S is configured to 1 (S113: YES), the old data to be updated is held in the secondary child-generation volume 122S. More accurately, the old data to be updated is stored in a prescribed area of the snapshot volume 124S corresponding to the secondary child-generation volume 122S.

Therefore, the second controller 11S copies the old data of the secondary child-generation volume 122S to the snapshot volume 124S corresponding to the secondary grandchild-generation volume 123S (S114). Furthermore, the second controller 11S uses the mapping information T20 to associate an area of the snapshot volume 124S, which is the copy destination, with an area of the secondary grandchild-generation volume 123S, and, in addition, changes the prescribed difference bit related to the secondary child-generation volume 122S to 1 (S114).

The second controller 11S overwrites the old data stored in the snapshot volume 124S with the remote copy-target data (S115).

Alternatively, in a case where the prescribed difference bit related to the secondary child-generation volume 122S is configured to 0 (S113: NO), the old data to be updated resides in the secondary parent volume 121S.

Therefore, the second controller 11S copies the old data of the secondary parent volume 121S to the snapshot volume 124S corresponding to the secondary grandchild-generation volume 123S, and changes the prescribed difference bit to 1 (S116). In addition, the second controller 11S uses the mapping information T20 to associate an area of the snapshot 124S, which is the copy destination, with an area of the secondary grandchild-generation volume 123S (S116).

The second controller 11S overwrites the old data stored in the snapshot volume 124S with the remote copy-target data (S117).

Configuring this example like this makes it possible to automatically link a volume operation in the first storage apparatus 10P with a volume operation in the second storage apparatus 10S.

Therefore, in this example, forming a remote copy pair beforehand using the primary parent volume 121P of the first storage apparatus 10P and the secondary parent volume 121S of the second storage apparatus 10S makes it possible to immediately virtually form a child-generation remote copy pair in accordance with the child-generation volumes 122P and 122S of the respective parent volumes 121P and 121S.

In this example, because the storage contents of the respective child-generation volumes 122P and 122S are a match, there is no need to carry out an initial copy from the primary child-generation volume 122P to the secondary child-generation volume 122S. Therefore, in this example, a remote copy of child-generation volumes can be achieved in a short period of time, making it possible to rapidly create a disaster recovery configuration.

In addition, in this example, when a primary child-generation volume 122P is created, instructions are automatically issued from the first storage apparatus 10P to the second storage apparatus 10S for the creation of a secondary child-generation volume 122S and the configuration of a remote copy pair. Therefore, user usability is able to be enhanced.

In this example, the primary and secondary child-generation volumes 122P and 122S, and the primary and secondary grandchild-generation volumes 123P and 123S are each created using a snapshot. Therefore, multiple generations of volumes can be created in a short period of time, and this, together with the effects according to the above-described configuration, enables the realization of a disaster recovery configuration in an even shorter period of time.

Example 2

A second example will be explained by referring to FIGS. 19 and 20. Each of the following examples, including this example, is equivalent to a variation of the first example, and as such, the explanations will focus on the difference(s) with the first example. In this example, it is possible to select either one of a child-generation volume or a grandchild-generation volume, thereby causing the storage content of the pair partner to match up with the selected volume.

Figure 19:
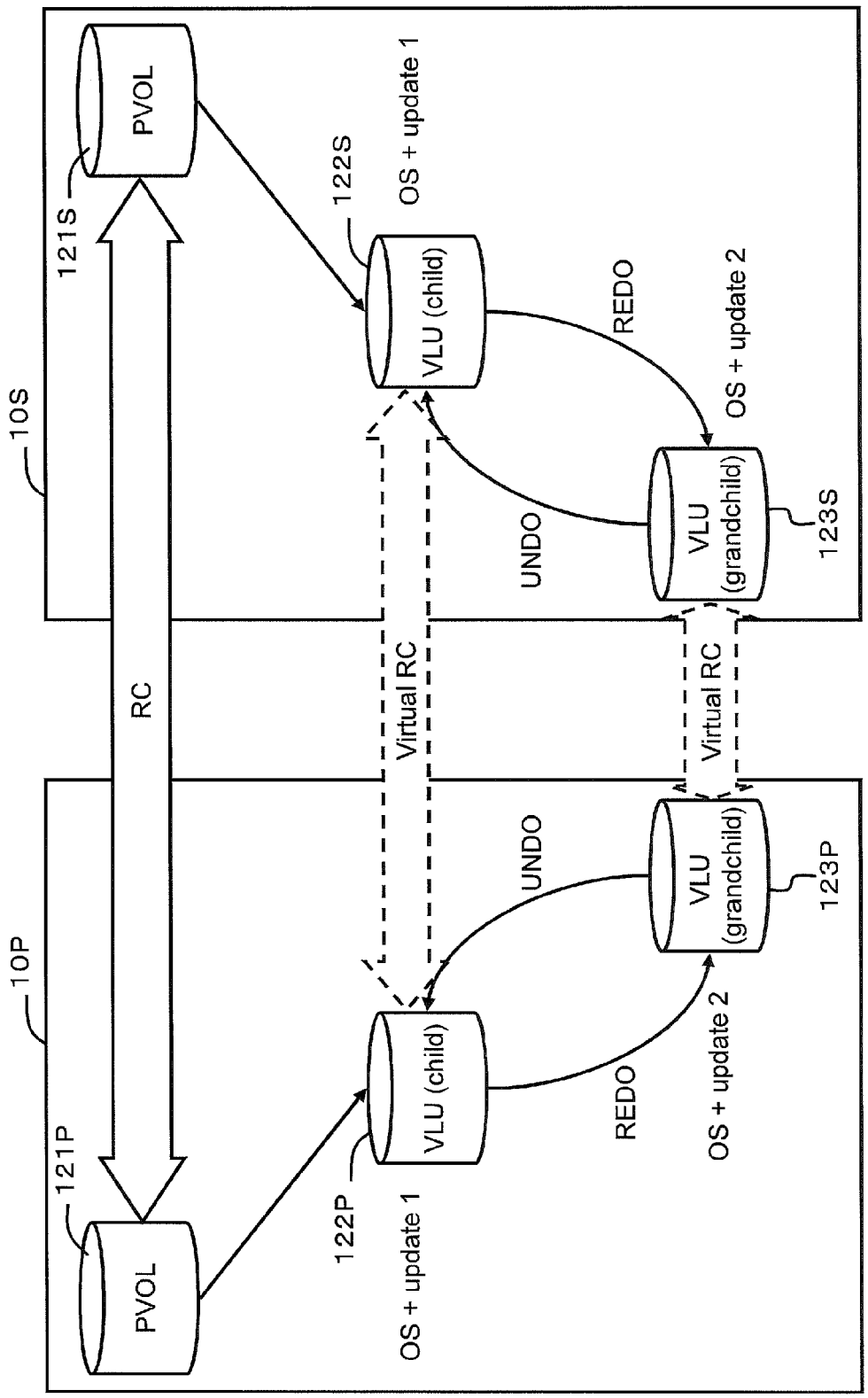
FIG. 19 is an illustration showing how to match up the storage content of either one of the first-order snapshot volume or the second-order snapshot volume related to a second example.
Figure 20:
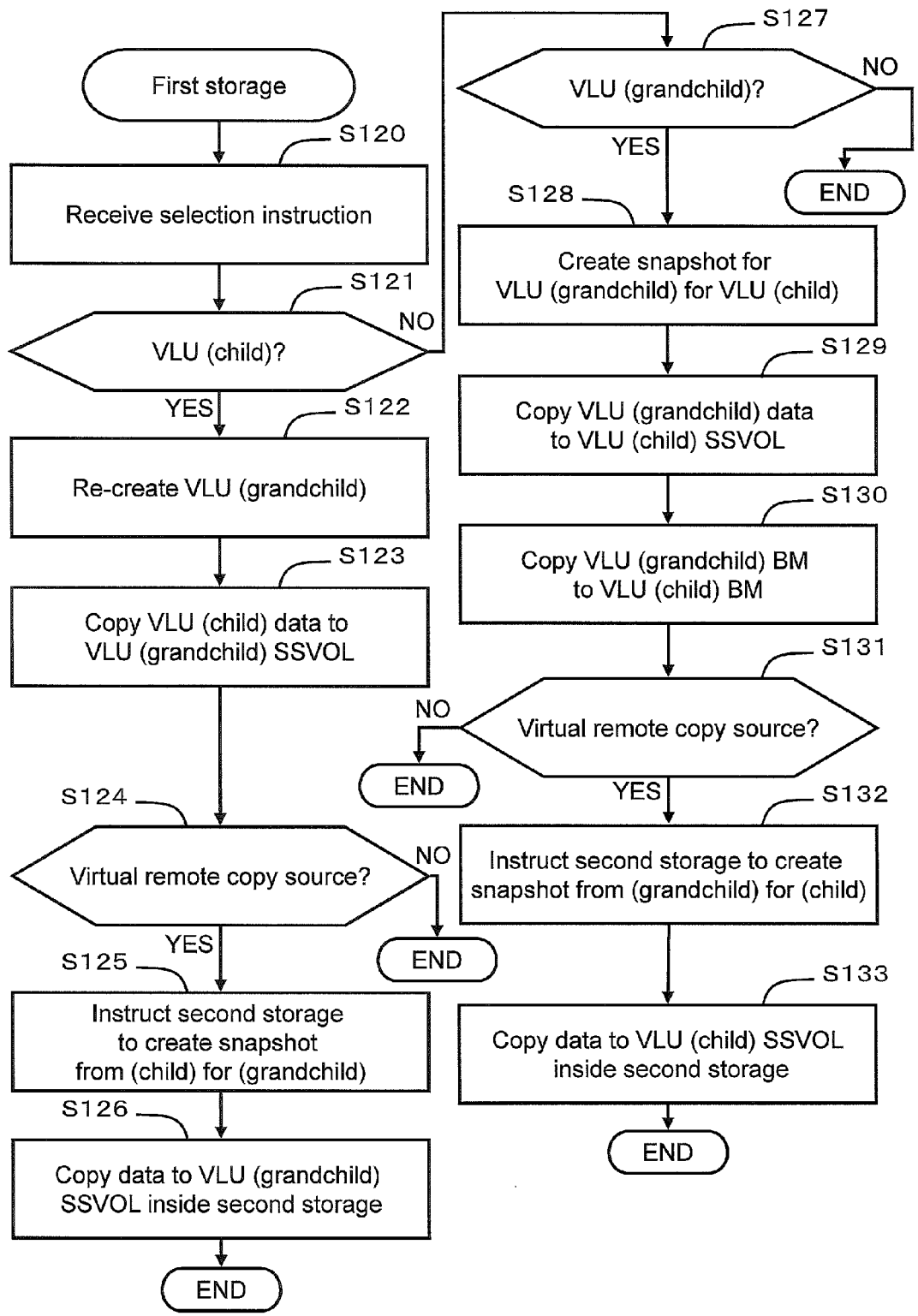
FIG. 20 is a flowchart of a process for selecting any one of multiple snapshot volumes.

FIG. 19 schematically shows the operation of this example. A basic operating system is stored in the primary parent volume 121P. A first update program is applied to the basic OS in the primary child-generation volume 122P. In addition, a second update program is applied to the grandchild-generation volume 123P. For example, the first update program is a first service pack comprising either one or multiple revision programs and data. The second update program is a second service pack.

The secondary parent volume 121S, the secondary child-generation volume 122S, and the secondary grandchild-generation volume 123S in the second storage apparatus 10S are configured the same as was described with respect to the first storage apparatus 10P. That is, a first update program is applied to the secondary child-generation volume 122S, and a second update program is applied to the secondary grandchild-generation volume 123S.

The same as was described with respect to the first example, the primary parent volume 121P and the secondary parent volume 121S form a normal remote copy pair. The primary child-generation volume 122P and the secondary child-generation volume 122S form a virtual remote copy pair for which an initial copy is not performed. The primary grandchild-generation volume 123P and the secondary grandchild-generation volume 123S also form a virtual remote copy pair.

The respective child-generation volumes 122P and 122S and the respective grandchild-generation volume 123P and 123S are created using snapshot technology. Although omitted from FIG. 19 for convenience sake, a snapshot volume is disposed in each of the storage apparatuses 10P and 10S.

The user can select either one of a child-generation volume or a grandchild-generation volume, and integrate the storage contents of the respective volumes with the storage content of the selected volume. For example, the latest update program may not be the best update program, and the performance of a volume to which the second update program has been applied could be inferior to the performance of a volume to which the first update program was applied. In this case, a user desiring a high-performance system will probably select the first update program. Therefore, the user selects the child-generation volume and matches the storage content of the grandchild-generation volume to the storage content of the child-generation volume. This is an UNDO-like operation.

In contrast to the above, in a case where the performance of the volume to which the second update program was applied is higher than the performance of the volume to which the first update program was applied, the user will probably select the grandchild-generation volume. In this case, the storage content of the child-generation volume is matched to the storage content of the grandchild-generation volume.

When the user issues an instruction for a volume operation inside the first storage apparatus 10P, the same as was described using the first example, a volume operation is executed in conjunction with this inside the second storage apparatus 10S as well.

A volume selection process of this example will be explained by referring to FIG. 20. The first controller 11P receives a selection instruction from the user (S120). This selection instruction comprises information as to which of the primary child-generation volume 122P or the primary grandchild-generation volume 123P is to be selected.

The first controller 11P determines whether or not the primary child-generation volume 122P has been selected (S121). In a case where the primary child-generation volume 122P was selected (S121: YES), the first controller 11P acquires a snapshot of the primary child-generation volume 122P and re-creates the primary grandchild-generation volume 123P (S122).

The first controller 11P resets the content of the difference bitmap T10 corresponding to the primary grandchild-generation volume 123P (S123). In addition, the first controller 11P refers to the difference bitmap T10 corresponding to the primary child-generation volume 122P, and copies the data of the area for which the difference bit is configured to 1 to the snapshot volume 124P corresponding to the primary grandchild-generation volume 123P (S123).

The first controller 11P determines whether or not the re-created primary grandchild-generation volume 123P is the remote copy source of a virtual remote copy pair (S124). In a case where the primary grandchild-generation volume 123P is the remote copy source (S124: YES), the first controller 11P instructs the second controller 11S to re-create the secondary grandchild-generation volume 123S (S125).

The second controller 11S executes the same processing that was described in S122 and S123 inside the second storage apparatus 10S (S126). The second controller 11S re-creates the secondary grandchild-generation volume 123S as a snapshot of the secondary child-generation volume 122S, resets the difference bitmap T10, and copies the data updated in the secondary child-generation volume 122S to the secondary grandchild-generation volume 123S.

Alternatively, in a case where the user did not select the primary child-generation volume 122P (S121: NO), the first controller 11P checks to make sure that the primary grandchild-generation volume 123P was selected (S127). This confirmation step S217 may be omitted.

In a case where the user has selected the primary grandchild-generation volume 123P (S127: YES), the first controller 11P re-creates the primary child-generation volume 122P as a snapshot of the primary grandchild-generation volume 123P (S128). The first controller 11P copies the data updated in the primary grandchild-generation volume 123P to the snapshot volume 124P corresponding to the primary child-generation volume 122P (S129).

The first controller 11P copies the content of the difference bitmap T10 corresponding to the primary grandchild-generation volume 123P to the difference bitmap T10 corresponding to the primary child-generation volume 122P (S130). After copying has ended, the first controller 11P resets the difference bitmap T10 corresponding to the primary grandchild-generation volume 123P (S130).

The first controller 11P determines whether or not the re-created primary child-generation volume 122P is the remote copy source of a virtual remote copy pair (S131). In a case where the child-generation volume 122P is the remote copy source (S131: YES), the first controller 11P instructs the second controller 11S to re-create the secondary child-generation volume 122S (S132).

The second controller 11S executes the same processing inside the second storage apparatus 10S as that described in S128 though S130 (S133).

That is, the second controller 11S re-creates the secondary child-generation volume 122S as a snapshot of the secondary grandchild-generation volume 123S, and copies the data updated in the secondary grandchild-generation volume 123S to the secondary child-generation volume 122S. In addition, the second controller 11S copies the difference bitmap T10 corresponding to the secondary grandchild-generation volume 123S to the difference bitmap T10 corresponding to the secondary child-generation volume 122S, and thereafter, resets the difference bitmap T10 of the secondary grandchild-generation volume 123S.

Configuring this example like this achieves the same effects as the first example. In addition, in this example, it is possible to select either one of multiple generation volumes, and to match the storage content of multiple generation volumes to the storage content of the selected volume. Then, in this example, in conjunction with a volume configuration change in the first storage apparatus 10P, the volume configuration of the second storage apparatus 10S is also changed the same as in the first example. This makes it possible to select a desired generation volume and re-create the disaster recovery configuration. User usability and system reliability are enhanced as a result of this.

Example 3

Figure 21:
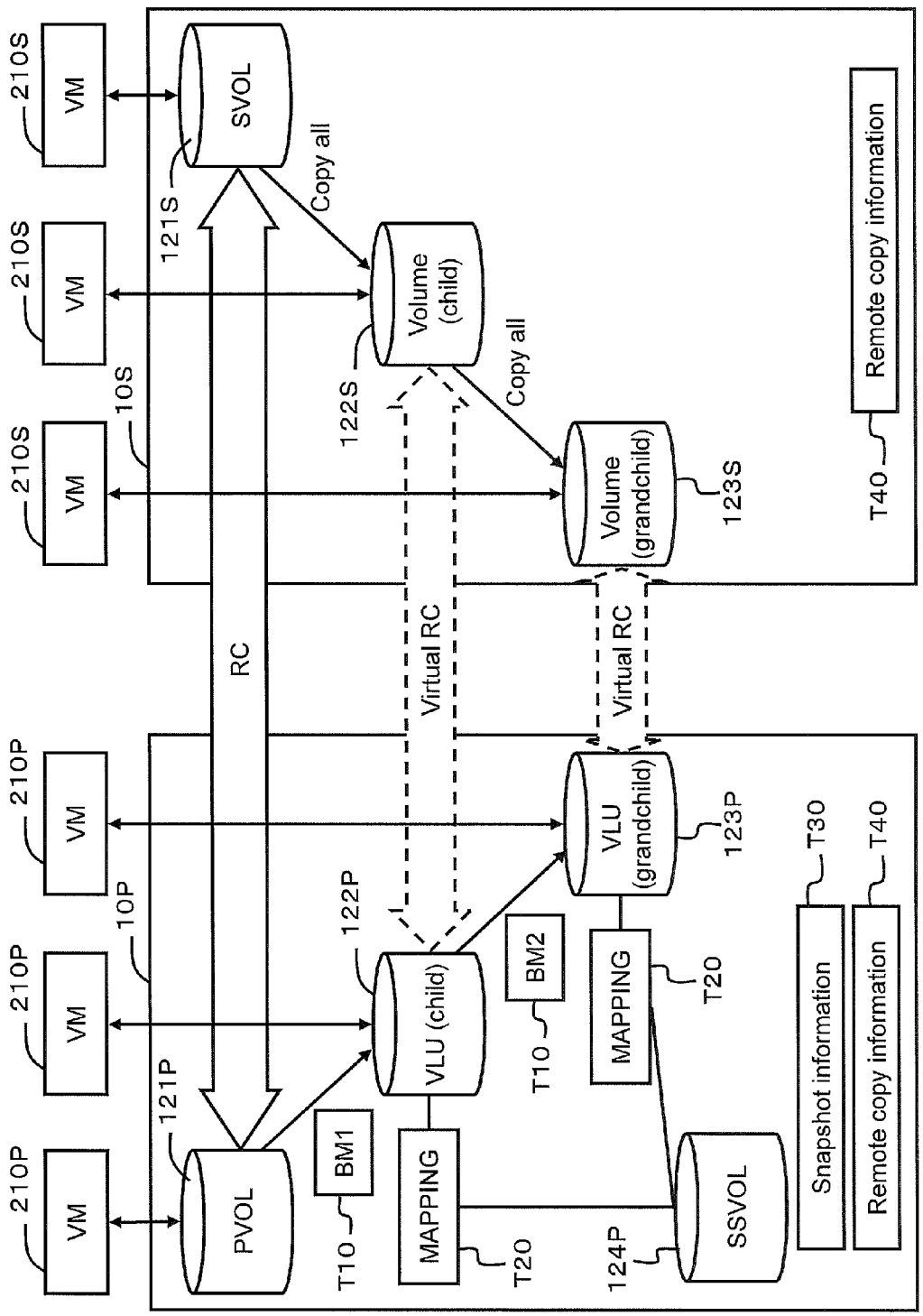
FIG. 21 is a conceptual diagram of a computer system comprising a storage apparatus related to a third example.

A third example will be explained by referring to FIG. 21. In this example, the respective generation volumes 122P and 123P are created inside the first storage apparatus 10P using snapshot technology, and the respective generation volumes 122S and 123S are created inside the second storage apparatus 10S using normal remote copy technology. Therefore, the secondary child-generation volume 122S and the secondary grandchild-generation volume 123S are both created as normal volumes.

Therefore, a snapshot volume 124S, and a difference bitmap T10 and mapping information T20 for managing a snapshot are not provided in the second storage apparatus 10S.

The primary parent volume 121P of the first storage apparatus 10P and the primary parent volume 121S of the second storage apparatus 10S form a normal remote copy. The primary child-generation volume 122P and the secondary child-generation volume 122S form a virtual remote copy. Similarly, the primary grandchild-generation volume 123P and the secondary grandchild-generation volume 123S form a virtual remote copy.

Since the primary parent volume 121P and the secondary parent volume 121S are synchronized, and the storage contents of the respective generations of volumes match, there is no need to carry out an initial copy. Because volume copy technology is used in the creation of the respective generations of volumes on the secondary side, more time is required than in a case where these volumes are created using snapshots. However, in a case where the size of the volume to be copied is small, a volume copy can be created in a relatively short time. Configuring this example like this also achieves the same effects as the first example.

Example 4

Figure 22:
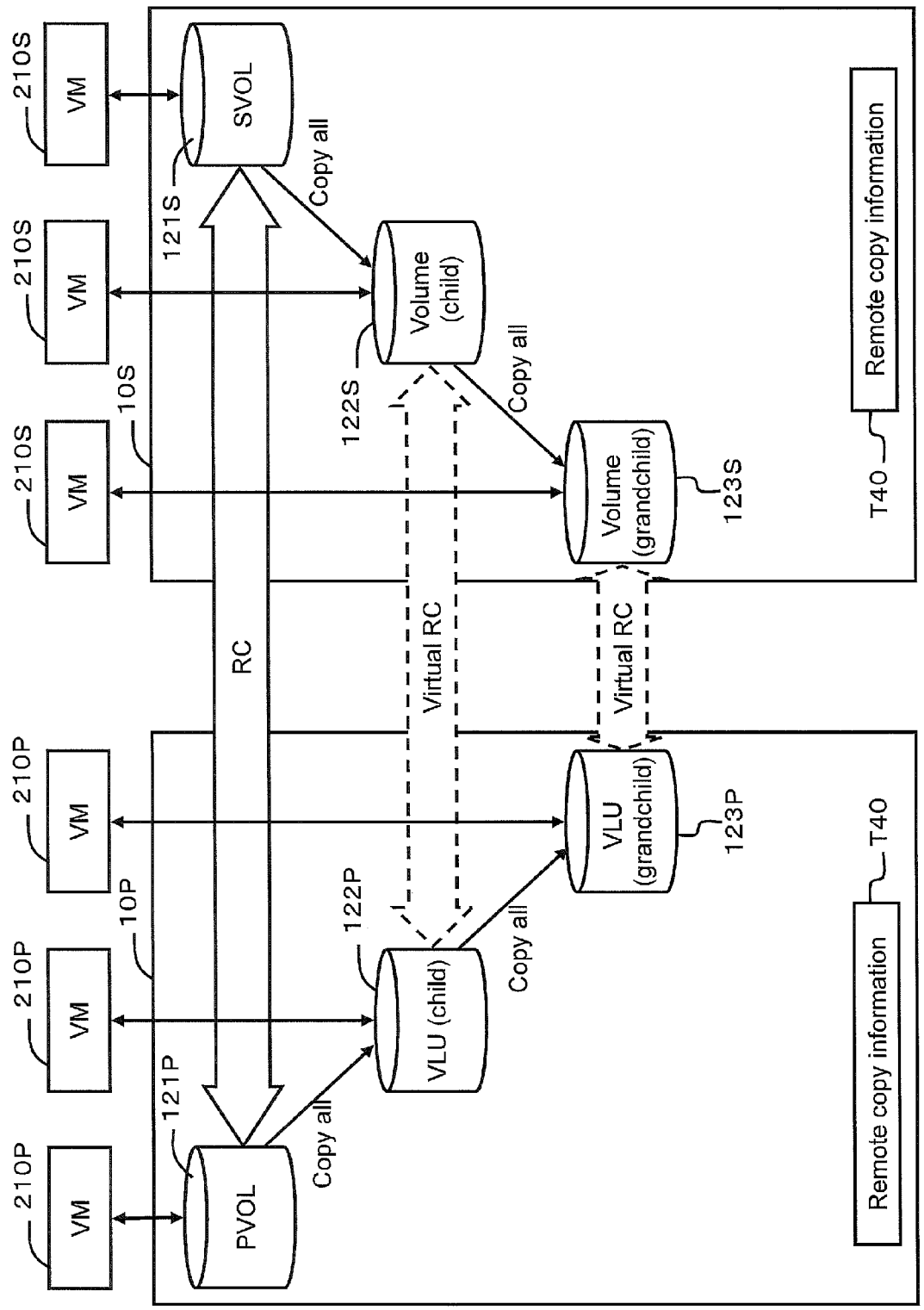
FIG. 22 is a conceptual diagram of a computer system comprising a storage apparatus related to a fourth example.

A fourth example will be explained by referring to FIG. 22. In this example, the respective generations of volumes are each created as normal volumes in both the first storage apparatus 10P and the second storage apparatus 10S. That is, the child-generation volumes 122P and 122S are created by carrying out volume copies of the parent volumes 121P and 121S. Similarly, the grandchild-generation volumes 123P and 123S are created by carrying out volume copies of the child-generation volumes 122P and 122S. The respective generations of volumes form virtual remote copy pairs.

In a case where the size of the volume to be copied is small, substantially the same effects as the third example can also be expected in this example.

The present invention is not limited to the embodiment described hereinabove. A so-called person having ordinary skill in the art could think of another configuration for attaining the objects of the present invention by changing or deleting a portion of the configuration described in the embodiment or adding a new configuration. This configuration will also fall within the scope of the present invention.

REFERENCE SIGNS LIST 1P, 1S, 10P, 10S Storage apparatus
2P, 11P First controller
2S, 11S Second controller
3PA, 121P Primary parent volume
3SA, 121S Secondary parent volume
3PB, 122P Primary child-generation volume
3SB, 12SS Secondary child-generation volume
3PC, 123P Primary grandchild-generation volume
3SC, 123S Secondary grandchild-generation volume
3PD, 3SD, 124P, 124S Snapshot volume

The invention claimed is:

1. A first storage apparatus, which is coupled to a second storage apparatus so as to be capable of two-way communications, wherein the first storage apparatus has a first controller and a first logical volume, which is controlled by the first controller, and wherein the first controller:

in a case where the second storage apparatus has a second logical volume for forming a first remote copy pair with the first logical volume when a first copy volume is created from the first logical volume, issues an instruction to a second controller of the second storage apparatus to create a second copy volume from the second logical volume that forms a second remote copy pair with the first copy volume;

checks that the second copy volume has been created, and forms a second remote copy pair of the first copy volume and the second copy volume;

determines whether or not the second storage apparatus has the second logical volume forming a remote copy pair with the first logical volume by using remote copy information that manages the remote copy; and in a case where the determination is made that the second storage apparatus has the second logical volume, issues an instruction to the second controller to create from the second logical volume a second copy volume forming a second remote copy pair with the first copy volume, and wherein, in a state in which the storage content of the first logical volume matches with the storage content of the second logical volume, the first copy volume is created from the first logical volume, and also the second copy volume is created from the second logical volume, and in accordance with this, the storage content of the first copy volume matches with the storage content of the second copy volume at a point in time when the second remote copy pair is formed.

2. A first storage apparatus according to claim 1, wherein the first remote copy pair and the second remote copy pair are synchronized remote copy pairs.

3. A first storage apparatus according to claim 2, wherein an initial copy is not performed between the first copy volume and the second copy volume when the second remote copy pair is formed, and thereafter, data written to the first copy volume is sent to the second storage apparatus and also written to the second copy volume.

4. A first storage apparatus according to claim 3, wherein the first copy volume is created using a snapshot of the first logical volume, the second copy volume is created using a snapshot of the second logical volume, and identification information denoting that the initial copy has not been implemented is set as the remote copy information with respect to the second remote copy pair for which the initial copy is not implemented.

5. A first storage apparatus according to claim 3 or claim 4, wherein the first controller:
creates a third copy volume from the first copy volume;
instructs the second controller to create from the second copy volume a fourth copy volume forming a third remote copy pair with the third copy volume; and
checks that the fourth copy volume has been created and forms the third remote copy pair of the third copy volume and the fourth copy volume, and an initial copy is not implemented between the third copy volume and the fourth copy volume, and thereafter, data written to the third copy volume is sent to the second storage apparatus and also written to the fourth copy volume.

6. A first storage apparatus according to claim 5, wherein the first controller:
receives an instruction to select either the first copy volume or the third copy volume;
matches the storage content of the third copy volume with the storage content of the fourth copy volume, and, in addition, instructs the second controller to match the storage content of the fourth copy volume with the storage content of the second copy volume in a case where the first copy volume has been selected; and
matches the storage content of the first copy volume with the storage content of the third copy volume, and, in addition,
instructs the second controller to match the storage content of the second copy volume with the storage content of the fourth copy volume in a case where the third copy volume has been selected.

7. A first storage apparatus according to claim 6, wherein the third copy volume is created using a snapshot of the first copy volume, the fourth copy volume is created using a snapshot of the second copy volume, and identification information denoting that the initial copy has not been implemented is set as the remote copy information with respect to the third remote copy pair.

8. A control method for a first storage apparatus, which is coupled to a second storage apparatus so as to be capable of two-way communications, wherein the first storage apparatus has a first controller and a first logical volume, which is controlled by the first controller, the method comprising the steps of comprising:
by the first controller, determining, on the basis of remote copy information for managing a remote copy, whether or not the second storage apparatus has a second logical volume for forming a first remote copy pair with the first logical volume when a first copy volume is created from the first logical volume by a snapshot;
issuing an instruction to a second controller of the second storage apparatus to use a snapshot from the second logical volume and create a second copy volume for forming a second remote copy pair with the first copy volume in a case where the determination is made that the second storage apparatus has the second logical volume;
checking that the second copy volume has been created;
forming a synchronized second remote copy pair from the first copy volume and the second copy volume; and
setting, as the remote copy information, identification information for denoting that an initial copy has not been implemented from the first copy volume to the second copy volume with respect to the second remote copy pair.

9. A control method for a first storage apparatus according to claim 8, further comprising the steps of:
by the first controller, creating a third copy volume using a snapshot from the first copy volume;
issuing an instruction to the second controller to use a snapshot from the second copy volume and create a fourth copy volume for forming a synchronized third remote copy pair with the third copy volume;
checking that the fourth copy volume has been created;
forming the third remote copy pair from the third copy volume and the fourth copy volume;
sending data written to the third copy volume to the second storage apparatus and causing this data also to be written to the fourth copy volume without implementing an initial copy between the third copy volume and the fourth copy volume;
receiving an instruction for selecting either the first copy volume or the third copy volume;
matching the storage content of the third copy volume with the storage content of the first copy volume, and, in addition,
instructing the second controller to match the storage content of the fourth copy volume with the storage content of the second copy volume in a case where the first copy volume was selected; and
matching the storage content of the first copy volume with the storage content of the third copy volume, and, in addition, instructing the second controller to match the storage content of the second copy volume with the storage content of the fourth copy volume in a case where the third copy volume was selected.

* * * * *